US 12,023,590 B2

(12) United States Patent
Fukada et al.

(10) Patent No.: US 12,023,590 B2
(45) Date of Patent: Jul. 2, 2024

(54) STORAGE MEDIUM STORING GAME PROGRAM, GAME APPARATUS, GAME SYSTEM, AND GAME PROCESSING METHOD

(71) Applicant: NINTENDO CO., LTD., Kyoto (JP)

(72) Inventors: Naoki Fukada, Kyoto (JP); Corey Michael Bunnell, Kyoto (JP); Yuya Sato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 18/322,220

(22) Filed: May 23, 2023

(65) Prior Publication Data

US 2023/0321544 A1 Oct. 12, 2023

Related U.S. Application Data

(63) Continuation of application No. 17/328,218, filed on May 24, 2021, now Pat. No. 11,701,588.

(30) Foreign Application Priority Data

Jun. 2, 2020 (JP) .................................. 2020-096049

(51) Int. Cl.
*A63F 13/57* (2014.01)
*A63F 13/49* (2014.01)

(52) U.S. Cl.
CPC .............. *A63F 13/57* (2014.09); *A63F 13/49* (2014.09)

(58) Field of Classification Search
CPC .......... A63F 13/57; A63F 13/49; A63F 13/25; A63F 13/40; A63F 13/42; A63F 13/426;

(Continued)

(56) References Cited

U.S. PATENT DOCUMENTS 9,174,133 B2 11/2015 Shimura
9,266,022 B1 2/2016 Pasqualone
(Continued)

FOREIGN PATENT DOCUMENTS

| JP | 2003-299879 A | 10/2003 |
| JP | 2010-94338 A | 4/2010 |
| JP | 2019-209115 A | 12/2019 |

OTHER PUBLICATIONS

"The Legend of Zelda Breath of the Wild", [online] Nintendo Co., Ltd, [searched on Apr. 24, 2020], internet < https://www.nintendo.co.jp/zelda/index.html >and its English page of <https://www.nintendo.com/games/detail/the-legend-of-zelda-breath-of-the-wild-switch/>, 9 pages.

(Continued)

*Primary Examiner* — David L Lewis
*Assistant Examiner* — Matthew D Hoel
(74) *Attorney, Agent, or Firm* — Nixon & Vanderhye P.C.

(57) ABSTRACT

Movement-related parameters used in virtual physical calculation are changed such that a designated object selected based on an operation input is caused to perform return movement to return to previously recorded positions and orientations, sequentially backward from the time of giving a start instruction based on the operation input. A state in a virtual space including a player character, the designated object, and other objects is updated based on the virtual physical calculation.

56 Claims, 13 Drawing Sheets

(58) Field of Classification Search
CPC ........ A63F 13/428; A63F 13/44; A63F 13/63; A63F 13/68; A63F 13/64
See application file for complete search history.

(56) References Cited

U.S. PATENT DOCUMENTS

| | | | |
|---|---|---|---|
| 9,427,663 | B2 | 8/2016 | Shimura |
| 9,573,064 | B2 | 2/2017 | Kinnebrew |
| 9,604,133 | B2 | 3/2017 | Shimura |
| 9,690,266 | B2 | 6/2017 | Songkakul |
| 10,304,287 | B2 | 5/2019 | Nelson |
| 10,610,782 | B2 | 4/2020 | Motokura |
| 10,785,621 | B1 | 9/2020 | Drake |
| 10,841,632 | B2 | 11/2020 | Chao |
| 10,918,944 | B2 | 2/2021 | Suzuki |
| 10,946,284 | B2 | 3/2021 | Chowdhary |
| 10,969,748 | B1 | 4/2021 | Goslin |
| 10,970,560 | B2 | 4/2021 | Khalfan |
| 11,076,276 | B1 | 7/2021 | Nocon |
| 11,110,351 | B2 | 9/2021 | Anabuki |
| 11,392,636 | B2 | 7/2022 | McKinnon |
| 11,484,797 | B2 | 11/2022 | Chowdhary |
| 11,491,397 | B2 | 11/2022 | Motokura |
| 2003/0190950 | A1 | 10/2003 | Matsumoto |
| 2003/0190951 | A1 | 10/2003 | Matsumoto |
| 2009/0215542 | A1 | 8/2009 | Takahashi |
| 2010/0099494 | A1 | 4/2010 | Dohta et al. |
| 2010/0151927 | A1 | 6/2010 | Miles |
| 2011/0183754 | A1 | 7/2011 | Alghamdi |
| 2015/0024845 | A1 | 1/2015 | Shimura |
| 2016/0023103 | A1 | 1/2016 | Shimura |
| 2017/0014711 | A1 | 1/2017 | Shimura |
| 2019/0060755 | A1* | 2/2019 | Motokura ............. A63F 13/537 |
| 2019/0366211 | A1* | 12/2019 | Suzuki ................... A63F 13/25 |
| 2019/0366212 | A1 | 12/2019 | Kusakihara |
| 2020/0078683 | A1 | 3/2020 | Anabuki |
| 2021/0236934 | A1* | 8/2021 | Yagihashi ............. A63F 13/533 |
| 2021/0316215 | A1 | 10/2021 | Sensui |
| 2021/0370178 | A1* | 12/2021 | Fukada ................. A63F 13/537 |
| 2021/0387084 | A1* | 12/2021 | Nakaguchi ........... G06F 3/0346 |
| 2022/0062760 | A1* | 3/2022 | Motokura ............. A63F 13/843 |
| 2022/0062762 | A1* | 3/2022 | Motokura ............... A63F 13/52 |
| 2022/0062768 | A1 | 3/2022 | Hiratake |
| 2022/0370908 | A1 | 11/2022 | Kipnis |
| 2023/0056381 | A1* | 2/2023 | Masuda .................. A63F 13/98 |
| 2023/0072022 | A1* | 3/2023 | Sumitomo ............ A63F 13/833 |
| 2023/0381647 | A1* | 11/2023 | Mizukami ............. A63F 13/822 |

OTHER PUBLICATIONS

Notice of Allowance issued on Jan. 29, 2024 for Japanese Patent Application No. 2020-096049 and its machine English Translation, five pages.

* cited by examiner

| ELAPSED TIME | POSITION DATA | ORIENTATION DATA |
| --- | --- | --- |
| t1 | PD1 | AD1 |
| t2 | PD2 | AD2 |
| ⋮ | ⋮ | ⋮ |
| tmax | PDmax | ADmax |

STORAGE MEDIUM STORING GAME PROGRAM, GAME APPARATUS, GAME SYSTEM, AND GAME PROCESSING METHOD

CROSS REFERENCE TO RELATED APPLICATIONS

This application is a Continuation of U.S. application Ser. No. 17/328,218, filed May 24, 2021, now allowed; which claims priority to Japanese Patent Application No. 2020-096049, filed on Jun. 2, 2020, the entire contents of which are incorporated herein by reference.

FIELD

The technology disclosed herein relates to storage media storing game programs, game apparatuses, game systems, and game processing methods for processing an object in a virtual space.

BACKGROUND AND SUMMARY

There are conventional game programs in which the motion of an object provided in a virtual space is utilized.

However, in such game programs, when an object has moved in a virtual space, a reverse motion of the object returning to its previous state before the movement cannot be utilized.

Under the above circumstances, it is an object of the present non-limiting example to provide a storage medium storing a game program, game apparatus, game system, and game processing method in which while the position and orientation of an object in a virtual space are caused to return to their previous states, the returning motion (or reverse motion) can be utilized.

To achieve the above object, the present non-limiting example may have the following configurations, for example.

A non-limiting example of a non-transitory computer-readable storage medium having stored therein a game program of the present non-limiting example is executed by a computer included in an information processing apparatus. The game program causes the computer to execute: controlling a player character in a virtual space based on a user's operation input; recording positions and orientations of objects in a range in the virtual space into a memory at time intervals, so that the positions and orientation are stored in chronological order in the memory; changing movement-related parameters used in virtual physical calculation such that a designated object of the objects which is selected based on the operation input, is caused to perform return movement to return to the previous positions and orientations stored in the memory, sequentially backward from the time of giving a start instruction based on the operation input; and updating a state in the virtual space including the player character, the designated object, and other objects, based on the virtual physical calculation.

Thus, a novel game can be implemented in which while the position and orientation of an object in a virtual space are caused to return to their previous states, the returning motion (or reverse motion) can be utilized.

In the return movement of the designated object, at each current point during the return movement, the position and orientation recorded earlier into the memory may be set as a target position and orientation, and a velocity and angular velocity, or an acceleration and angular acceleration, of the designated object may be changed as the parameters such that the designated object returns to the target position and orientation.

Thus, by causing an object to perform return movement using a velocity and angular velocity, or an acceleration and angular acceleration, the object can be moved according to a physical law in the virtual space.

The time intervals at which the positions and orientations are recorded may correspond to a frame which is a unit time of display, and the positions and orientation may be stored in the memory on a frame-by-frame basis. At each current frame during the return movement, the position and orientation recorded into the memory in association with a further previous frame may be set as the target position and orientation.

Thus, an object is moved to return to a position and orientation recorded for each unit time of display as a target, resulting in smooth return movement.

The positions and orientations recorded into the memory at time intervals may correspond to at least a first period of time immediately before the time of giving the start instruction.

Thus, an object is caused to perform return movement based on stored positions and orientations corresponding to the most recent first period of time. Therefore, a motion that tracks backward changes in position and/or orientation of the object remembered by the user can be implemented.

The game program may cause the computer to further execute: in response to completion of the return movement of the designated object to the position and orientation recorded into the memory the first period of time before, or to an instruction to cancel the return movement by the operation input, ending the return movement.

Thus, the return movement of an object that will end when a planned movement is completed can be stopped according to on the user's operation.

The game program may cause the computer to further execute: disposing, in the virtual space, a path display object indicating a movement path on which the designated object performs the return movement, based on the positions and orientations stored in the memory.

Thus, a path on which the return movement is planned can be presented to the user.

The time intervals at which the positions and orientations are recorded may correspond to a frame which is a unit time of display, and the positions and orientation may be stored in the memory on a frame-by-frame basis, and the positions and orientations recorded into the memory at time intervals may correspond to at least a first period of time immediately before the time of giving the start instruction. The game program may cause the computer to further execute: in response to selection of the designated object based on the operation input, disposing, in the virtual space, a path display object indicating a movement path corresponding to the first period of time on which the designated object performs the return movement, based on the positions and orientations stored in the memory. In this case, in the return movement of the designated object based on the start instruction, at each current frame during the return movement, the position and orientation recorded into the memory in association with a further previous frame may be set as a target position and orientation, and a velocity and angular velocity, or an acceleration and angular acceleration, of the designated object may be changed as the parameters such that the designated object returns to the target position and orientation. The game program may cause the computer to further execute: in response to completion of the return movement of the designated object to the position and orientation recorded into the memory the first period of time before, or to an instruction to cancel the return movement by the operation input, ending the return movement.

Thus, the stored positions and orientations corresponding to the first period of time are updated during display of the movement path. Therefore, the movement path can be gradually changed and decreased by erasing a further previous portion thereof during display of the movement path.

In the return movement of the designated object toward the position and orientation recorded into the memory the first period of time before, the return movement may be ended even in response to a result of the virtual physical calculation indicating that the designated object fails to return to the position and orientation recorded into the memory the first period of time before.

Thus, even in the case of failure to return to the position and orientation recorded the first period of time before, the return movement can be ended.

The game program may cause the computer to further execute: based on a selection start instruction based on the operation input, causing a game mode to transition from a normal mode in which selection of the designated object is disabled to a selection mode in which selection of the designated object is enabled; and in the selection mode, rendering an object selectable as the designated object, in a display form different from in the normal mode.

Thus, a selectable object can be presented as a designated object to be caused to perform return movement differently.

The game program may cause the computer to further execute: controlling a virtual camera based on the operation input; in the selection mode, in presence of an object selectable as the designated object at a display position of a pointer disposed at a position in a screen, selecting the object as the designated object; and in presence of the selected designated object, starting the return movement of the designated object in response to the start instruction.

Thus, a pointer for selecting a designated object to be caused to perform return movement from selectable objects can be presented to the user.

A transitionable state change may be set for each of the objects in advance. The game program may cause the computer to further execute: updating a state in the virtual space based on the physical calculation, and state change calculation that causes the objects in the virtual space to make the state change, depending on behavior of the player character and surrounding conditions. The state change may be performed even during the return movement irrespective of a previous state.

Thus, in the return movement, the state of an object is not caused to return to its previous states. Therefore, a novel game can be implemented which is different from games in which an object is caused to only return to its previous states.

The state change may include disappearance of the objects. In response to the disappearance of the designated object during the return movement, the return movement may be ended.

Thus, when a state change occurs which causes an object to disappear during return movement, the return movement is ended. Therefore, a novel game can be implemented which is different from games in which an object is caused to only return to its previous states.

The present non-limiting example may be implemented in the form of a game apparatus, game system, and game processing method.

In the present non-limiting example, a game can be implemented in which while the position and orientation of an object in a virtual space are caused to return to their previous states, the returning motion (or reverse motion) can be utilized.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

A game system according to the present non-limiting example will now be described. A non-limiting example of a game system 1 according to the present non-limiting example includes a main body apparatus (information processing apparatus serving as the main body of a game apparatus in the present non-limiting example) 2, a left controller 3, and a right controller 4, and also serves as an information processing system. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the description that follows, a hardware configuration of the game system 1 of the present non-limiting example is described, and thereafter, the control of the game system 1 of the present non-limiting example is described.

Figure 1:
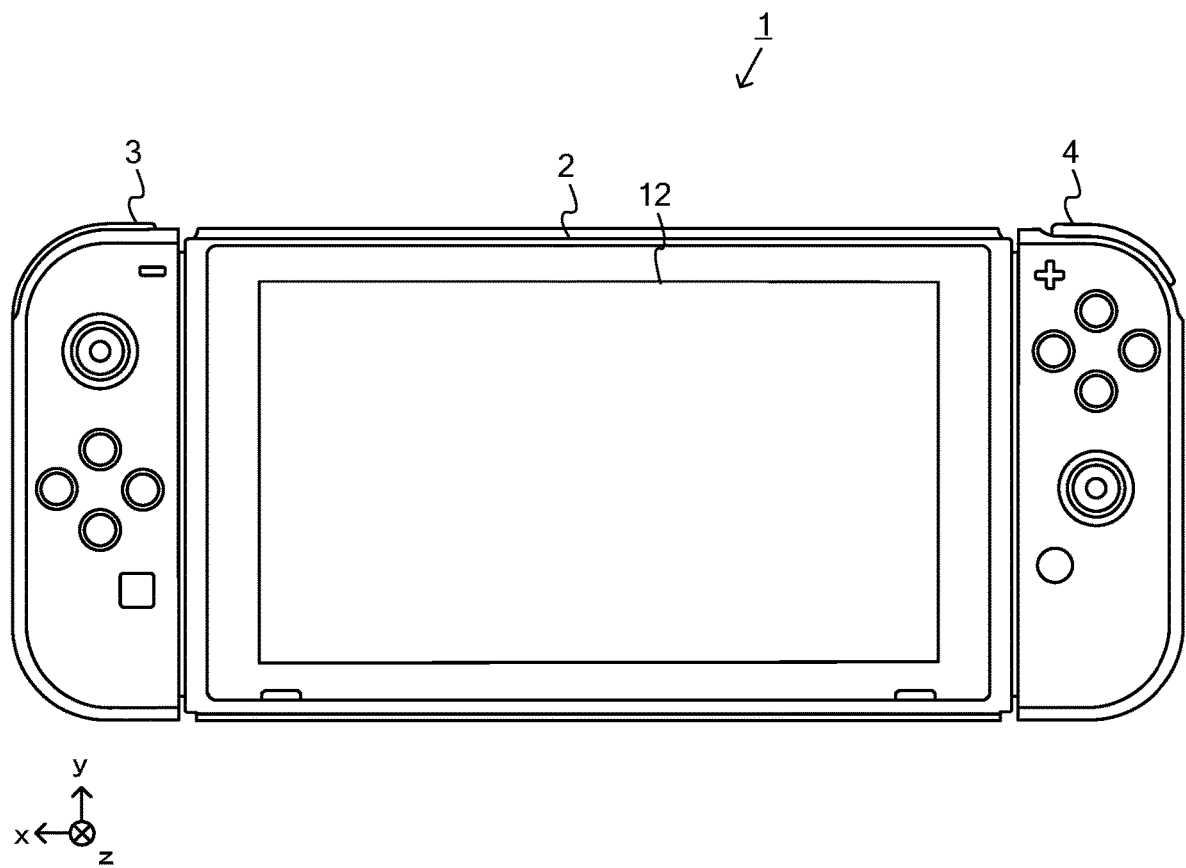
FIG. 1 is a diagram showing a non-limiting example of a state where a left controller 3 and a right controller 4 are attached to a main body apparatus 2.

FIG. 1 is a diagram showing a non-limiting example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
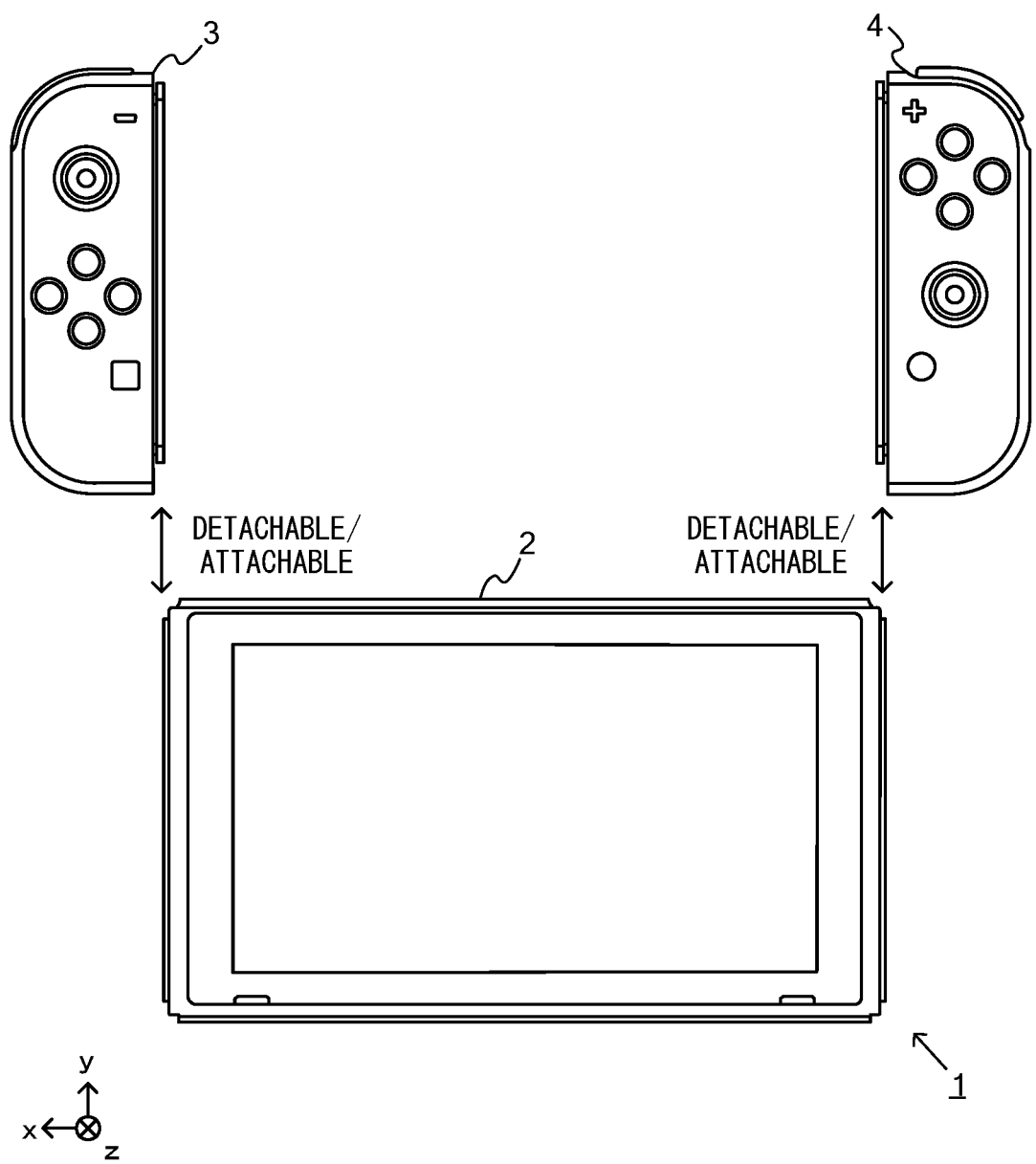
FIG. 2 is a diagram showing a non-limiting example of a state where each of the left controller 3 and the right controller 4 are detached from the main body apparatus 2.

FIG. 2 is a diagram showing a non-limiting example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller."

Figure 3:
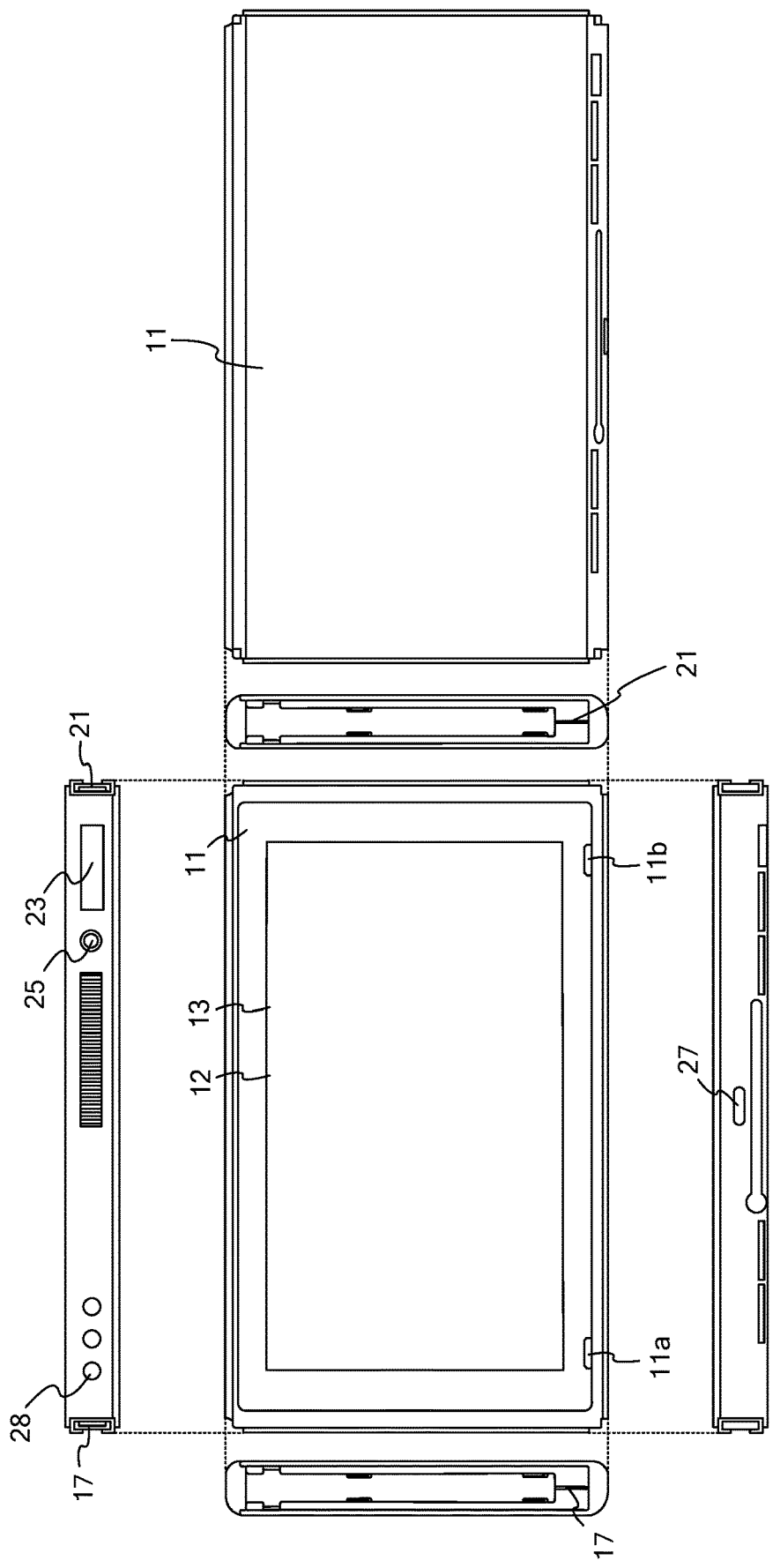
FIG. 3 is six orthogonal views showing a non-limiting example of the main body apparatus 2.

FIG. 3 is six orthogonal views showing a non-limiting example of the main body apparatus 2. As shown in FIG. 3, the main body apparatus 2 includes an approximately plate-shaped housing 11. In this non-limiting example, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In this non-limiting example, the display 12 is a liquid crystal display device (LCD). The display 12, however, may be a display device of any suitable type.

In addition, the main body apparatus 2 includes a touch panel 13 on the screen of the display 12. In this non-limiting example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 shown in FIG. 6) inside the housing 11. As shown in FIG. 3, speaker holes 11a and 11b are formed in the main surface of the housing 11. The speaker 88 outputs sounds through the speaker holes 11a and 11b.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In this non-limiting example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in this non-limiting example, the cradle has the function of charging the unified apparatus or the main body apparatus 2 alone, being placed thereon. The cradle also functions as a hub device (specifically, a USB hub).

Figure 4:
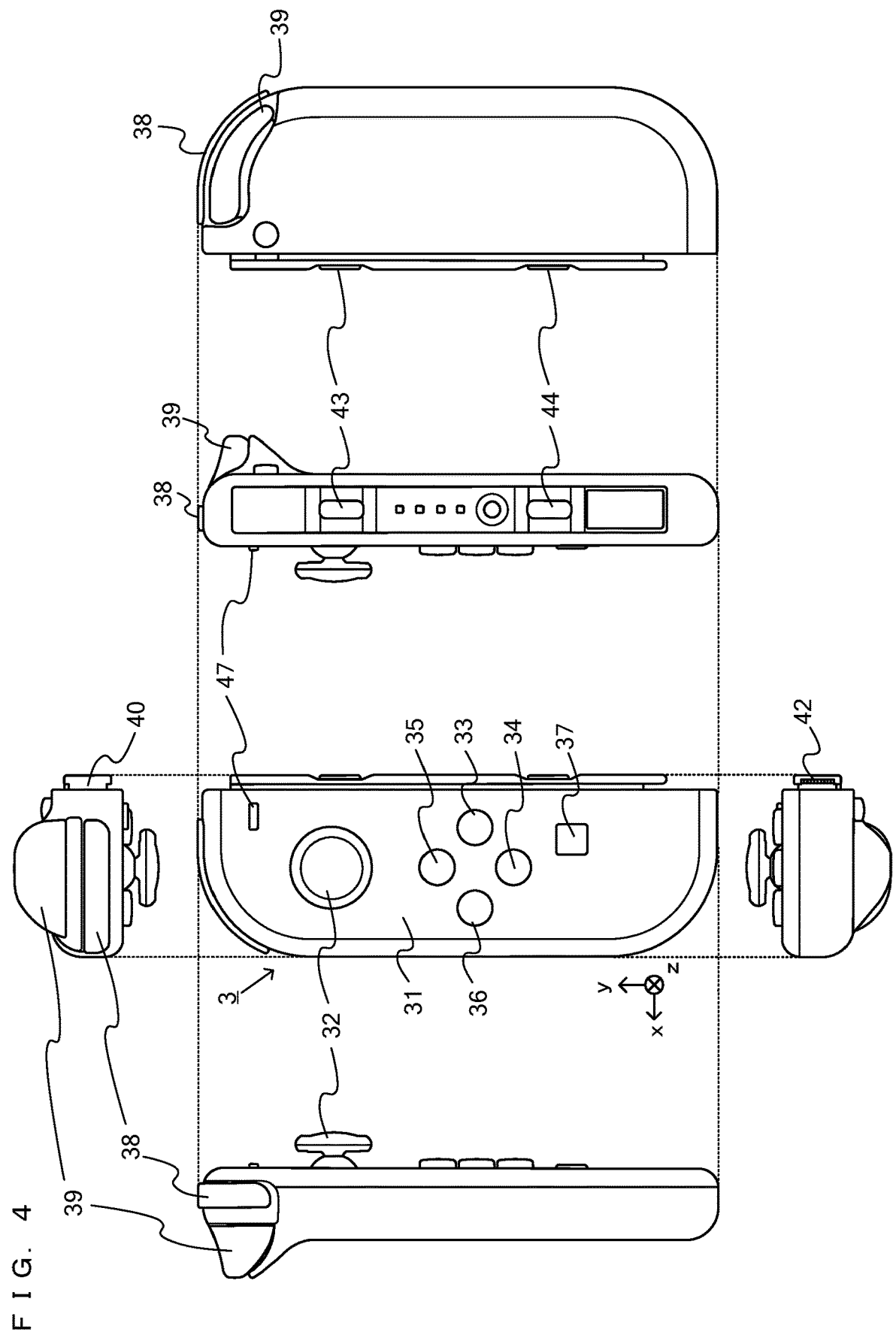
FIG. 4 is six orthogonal views showing a non-limiting example of the left controller 3.

FIG. 4 is six orthogonal views showing a non-limiting example of the left controller 3. As shown in FIG. 4, the left controller 3 includes a housing 31. In this non-limiting example, the housing 31 has a vertically long shape, e.g., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in this non-limiting example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

Figure 5:
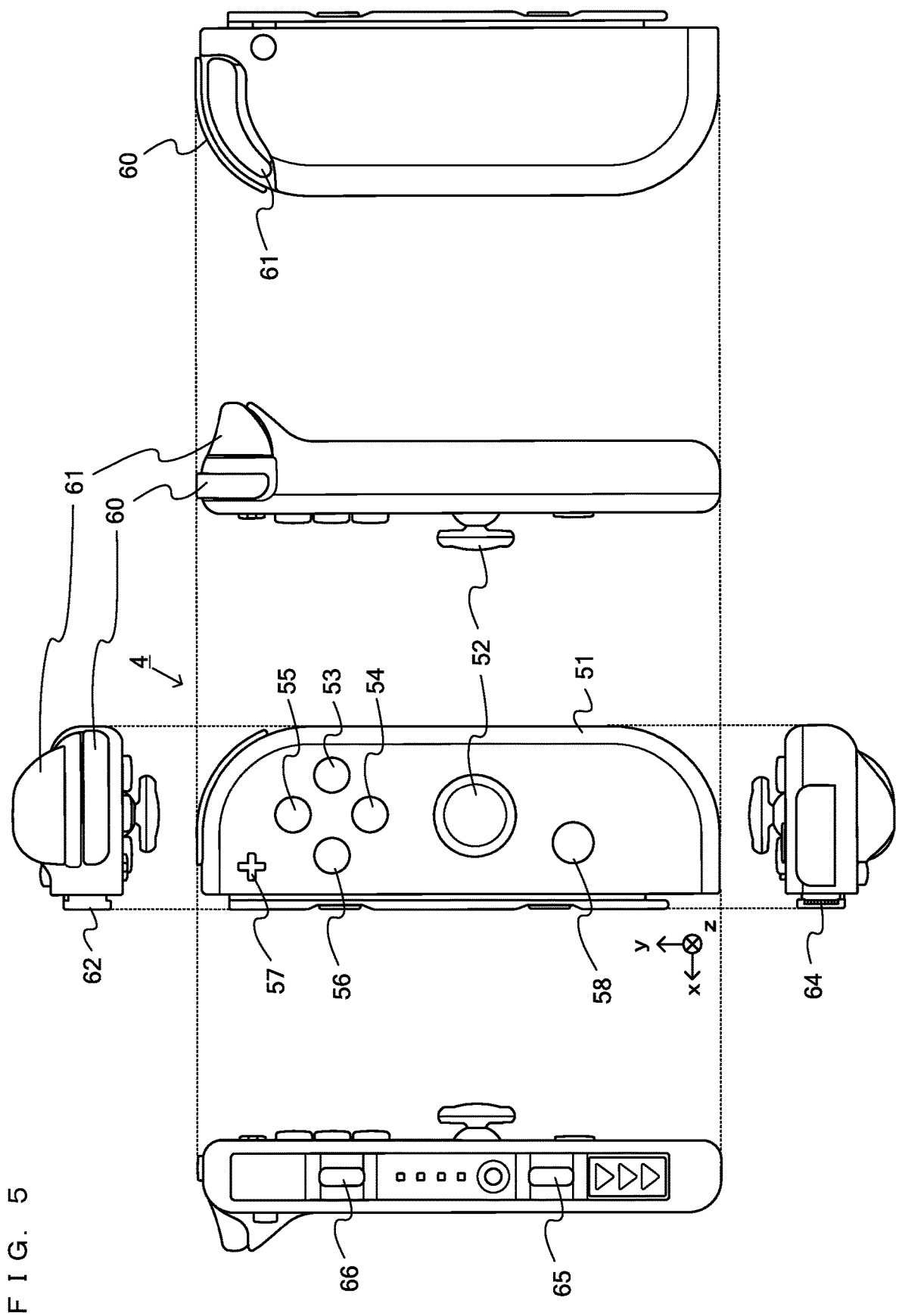
FIG. 5 is six orthogonal views showing a non-limiting example of the right controller 4.

FIG. 5 is six orthogonal views showing a non-limiting example of the right controller 4. As shown in FIG. 5, the right controller 4 includes a housing 51. In this non-limiting example, the housing 51 has a vertically long shape, e.g., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In this non-limiting example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
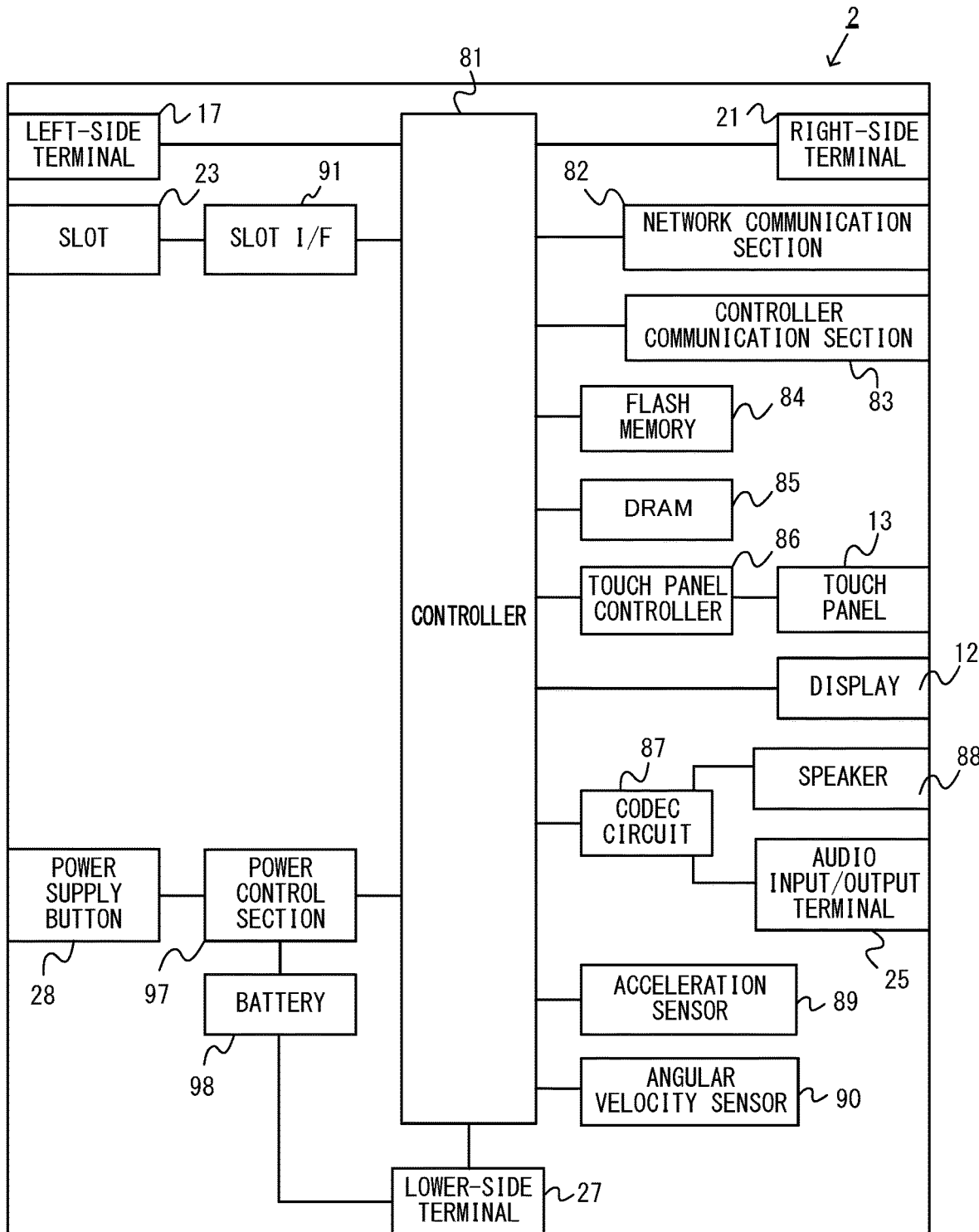
FIG. 6 is a block diagram showing a non-limiting example of an internal configuration of the main body apparatus 2.

FIG. 6 is a block diagram showing a non-limiting example of an internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In this non-limiting example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication," in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In this non-limiting example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in this non-limiting example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As an example, a first user can provide an input to the main body apparatus 2 using a first set of left and right controllers 3 and 4, and at the same time, a second user can provide an input to the main body apparatus 2 using a second set of left and right controllers 3 and 4.

The main body apparatus 2 includes a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input has been performed. Then, the touch panel controller 86 outputs the data to the processor 81.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

The main body apparatus 2 includes a power control section 97 and a battery 98. The power control section 97 is connected to the battery 98 and the processor 81. Further, although not shown, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 7:
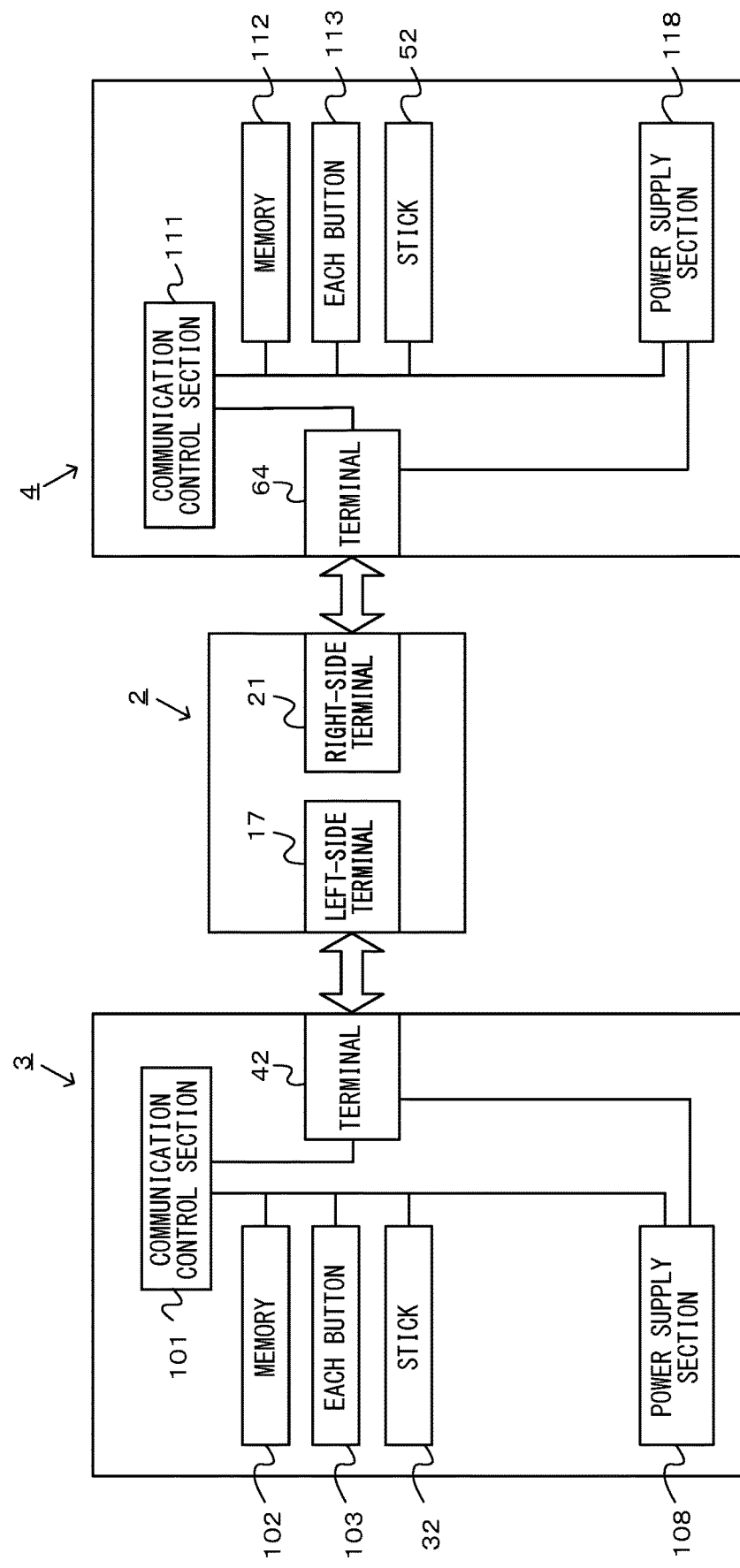
FIG. 7 is a block diagram showing examples of internal configurations of the main body apparatus 2, the left controller 3, and the right controller 4.

FIG. 7 is a block diagram showing non-limiting examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In this non-limiting example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In this non-limiting example, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a processing section 121. The processing section 121 is connected to the communication control section 111.

The right controller 4 includes a power supply section 118. The power supply section 118 has a function similar to that of the power supply section 108 of the left controller 3 and operates similarly to the power supply section 108.

As described above, in the game system 1 of this non-limiting example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will now be described, assuming the situation that the unified apparatus obtained by attaching the left controller 3 and the right controller 4 to the main body apparatus 2 is used.

Thus, a game is played in a virtual space displayed on the display 12, according to operations performed on the operation buttons and sticks of the left controller 3 and/or the right controller 4 of the unified apparatus in the game system 1, touch operations performed on the touch panel 13 of the main body apparatus 2, operations that move the whole unified apparatus, and the like. In this non-limiting example, as an example, a game can be played using a player character in the virtual space and each of objects provided in the virtual space, according to the user's operation using the operation buttons and sticks, and the touch panel 13.

Figure 8:
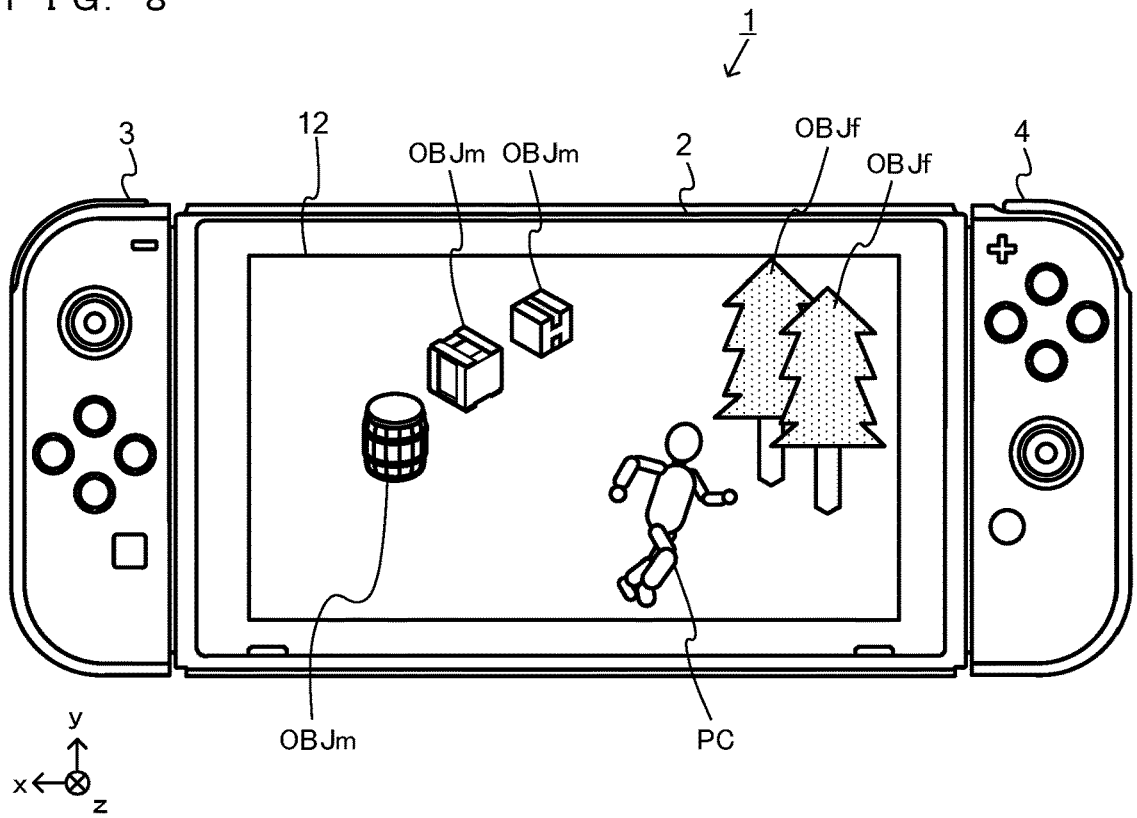
FIG. 8 is a diagram showing a non-limiting example of how a game is played using a player character PC appearing in a virtual space.
Figure 9:
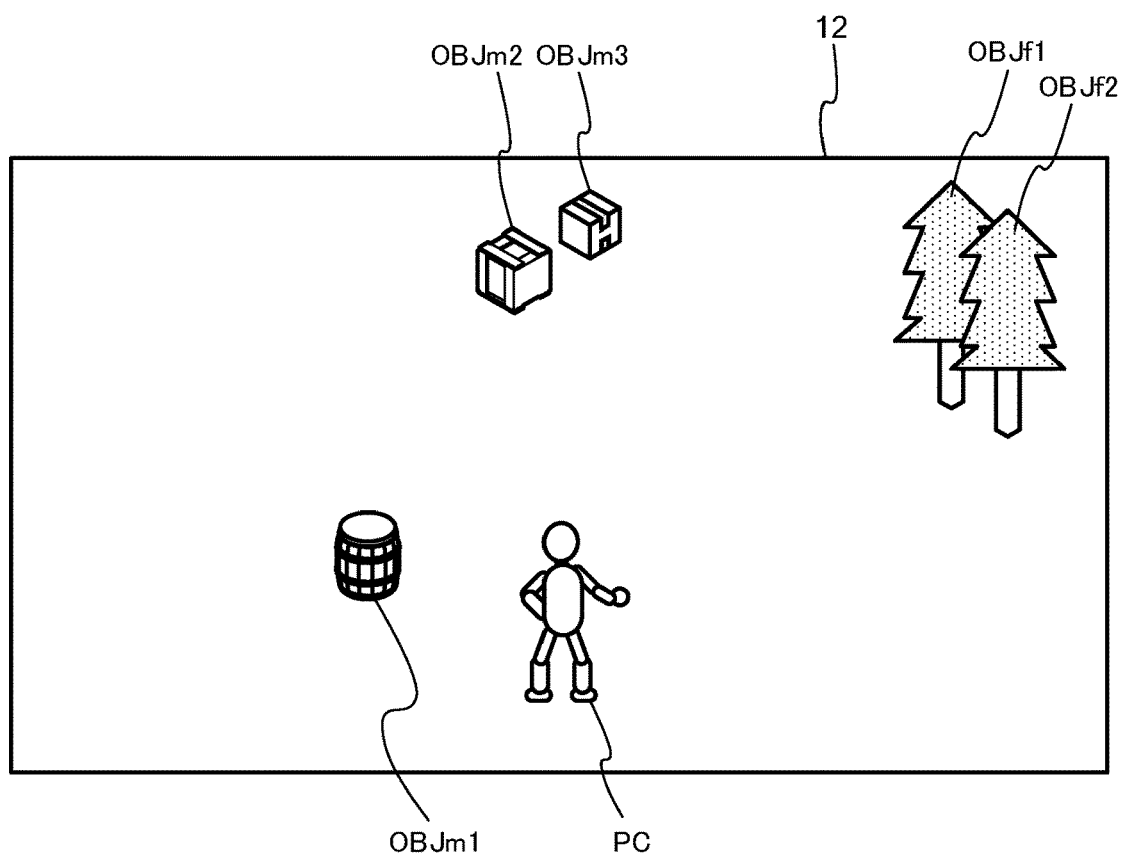
FIG. 9 is a diagram showing a non-limiting example of a situation of a virtual space before return movement is performed.
Figure 10:
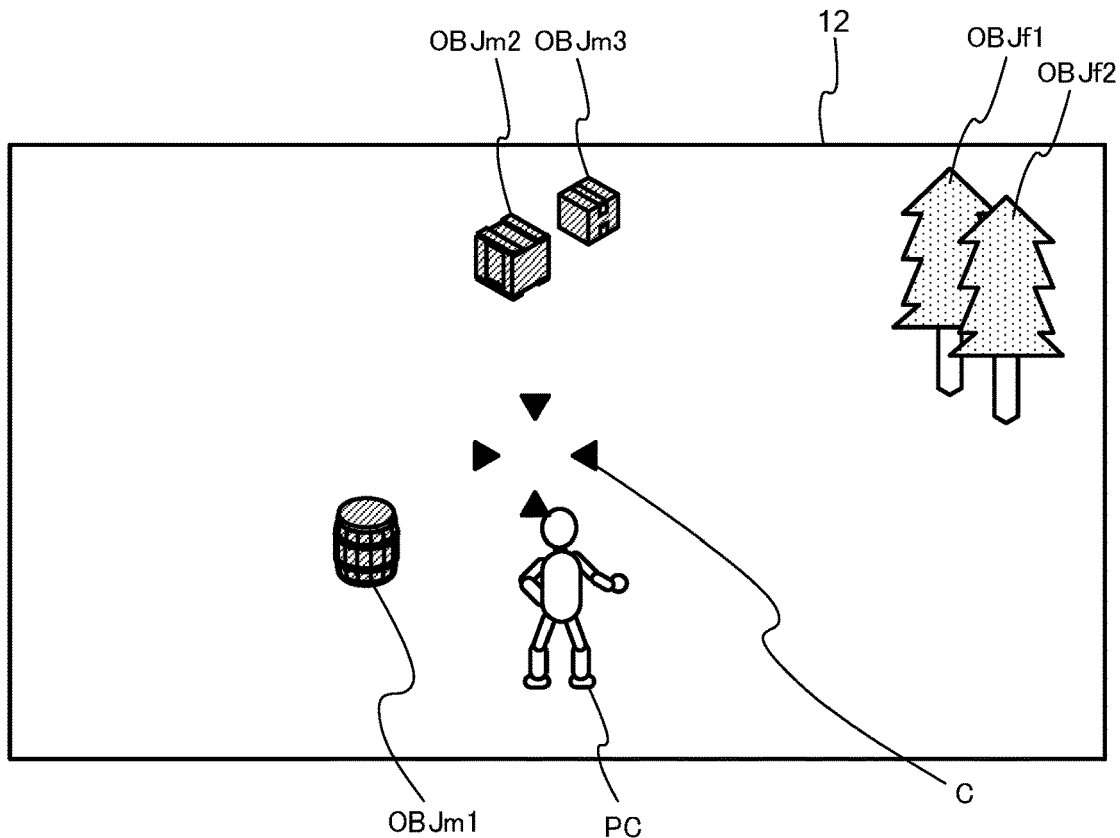
FIG. 10 is a diagram showing a non-limiting example of how a movable object OBJm to be caused to perform return movement is displayed.
Figure 11:
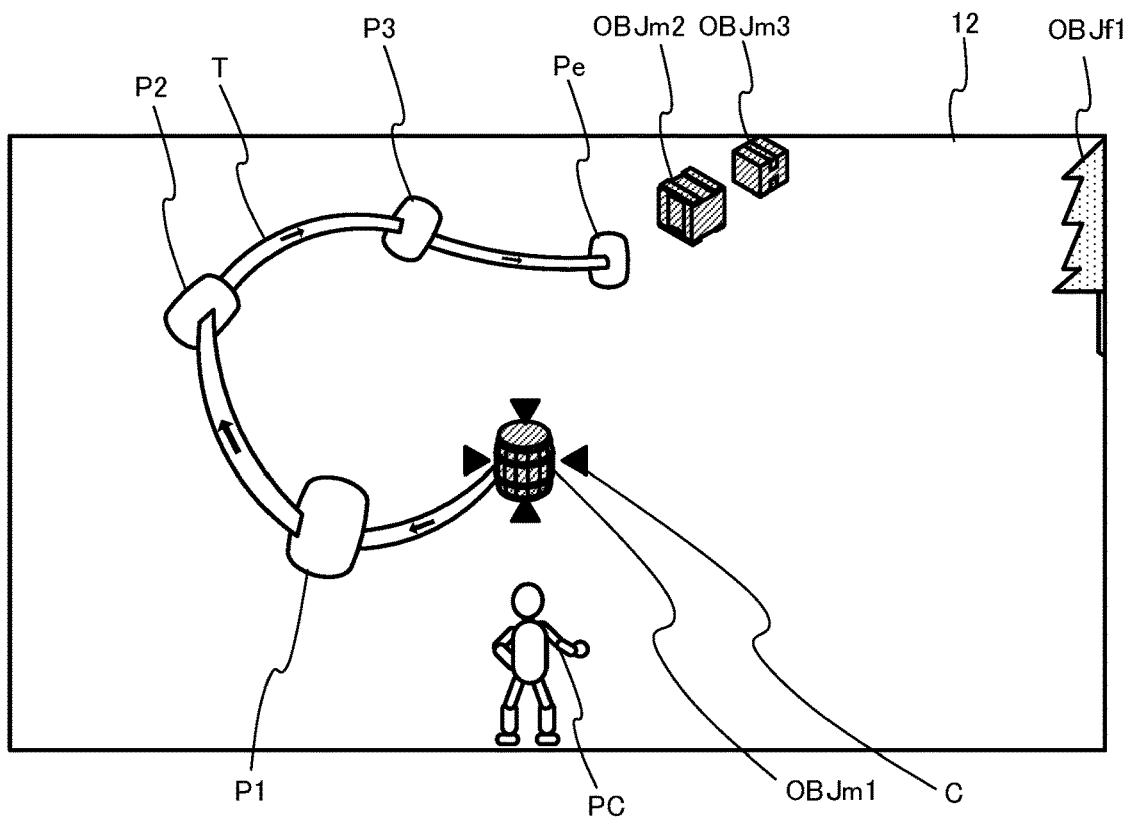
FIG. 11 is a diagram showing a non-limiting example of how a path display object T is displayed when a designated movable object OBJm is caused to perform return movement.
Figures 12, 13:
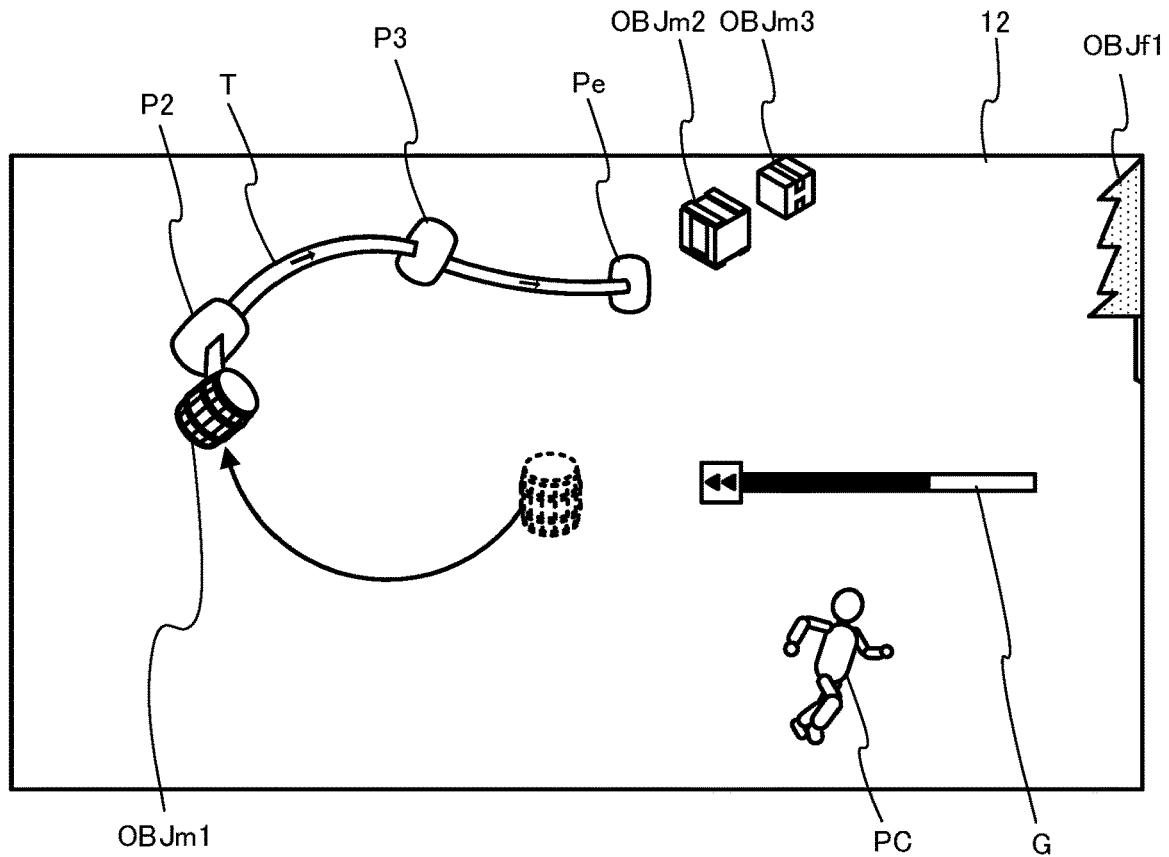
FIG. 12 is a diagram showing a non-limiting example of a situation in which a designated movable object OBJm is performing return movement.
FIG. 13 is a diagram showing a non-limiting example of stored data of previous positions of a movable object OBJm.

A game process executed in the game system 1 will be outlined with reference to FIGS. 8-13. It should be noted that FIG. 8 is a diagram showing a non-limiting example of how a game is played using a player character PC appearing in a virtual space, showing a game image displayed on the display 12 of the main body apparatus 2. FIG. 9 is a diagram showing a non-limiting example of a situation of the virtual space before return movement is performed. FIG. 10 is a diagram showing a non-limiting example of how a movable object OBJm to be caused to perform return movement is displayed. FIG. 11 is a diagram showing a non-limiting example of how a path display object T is displayed when a designated movable object OBJm is caused to perform return movement. FIG. 12 is a diagram showing a non-limiting example of a situation in which a designated movable object OBJm is performing return movement. FIG. 13 is a diagram showing a non-limiting example of stored data of previous positions of the movable object OBJm. Although in the description that follows, a game is used as a non-limiting example of an application executed in the game system 1, other applications may be executed in the game system 1.

In FIG. 8, the display 12 of the game system 1 is displaying a game image in which a player character PC and a plurality of objects OBJ are disposed in a virtual space. For example, in this non-limiting example, the player character PC provided in the virtual space is moved according to the user's operation performed on the game system 1. The objects OBJ disposed in the virtual space in this non-limiting example include movable objects OBJm whose positions can be moved and whose orientations can be changed in the virtual space, and fixed objects OBJf whose positions cannot be moved and whose orientations can be changed in the virtual space. As an example, the movable objects OBJm are an object that can be moved or whose state transitions, depending on the movement of the player character PC, and the fixed objects OBJf are an object that cannot be moved by the movement of the player character PC, such as a terrain, building, or tree.

In this non-limiting example, the player character PC can move the movable object OBJm, and can change a situation in the virtual space by moving the movable object OBJm. In addition, in this non-limiting example, the player character PC has an ability to cause the movable object OBJm which has voluntarily moved in the virtual space or has been temporarily moved by the player character PC to perform return movement, i.e., to return to a position where the movable object OBJm was located a predetermined period of time before. It should be noted that by the return movement, the motion of a movable object OBJm designated by the user operating the player character PC is revered, and the state of the movable object OBJm changed due to the motion is not caused to return to a previous state. For example, when a movable object OBJm designated by the user is caused to perform return movement, the position and orientation of the movable object OBJm can be caused to return to a previous position and orientation, and the movable object OBJm itself or an internal state thereof cannot be restored. An influence or the like exerted by the movement of the movable object OBJm on other objects before the return movement cannot be subsequently canceled. Here, examples of transitionable or changeable states of the movable object OBJm include damage, burning, electricity resistance, leakage, freezing, and disappearance, depending on the material of the object. In the return movement, such transitionable states are not caused to return to a previous state. Even during the return movement, the transition process of changing a state is performed irrespective of previous states.

In FIG. 9, in the virtual space that is displayed on the display 12 before the user operating the player character PC performs an operation of giving an instruction to perform return movement, the player character PC, three movable objects OBJm1-OBJm3, and two fixed objects OBJf1 and OBjf2 are disposed. By performing a predetermined operation, the user can cause at least one of the movable objects OBJm that have moved immediately before (up to a predetermined period of time before (e.g., 20 seconds before)) to move backward (in a time-reversed fashion) in the path in which the movable object has moved, i.e., to perform return movement.

In FIG. 10, when the user performs an operation of giving an instruction to start selection of an object to be caused to perform return movement (operation of activating a return movement action), the game mode transitions, based on the instruction, from a normal mode in which selection of an object to be caused to perform return movement (designated object) is disabled to a selection mode in which the selection is enabled. In the selection mode, objects that can be selected as an object to be caused to perform return movement are rendered in a display form different from in the normal mode. As an example, in the non-limiting example of FIG. 10, objects that can be selected as an object to be caused to perform return movement are rendered in a display form different from in the normal mode, by changing the color of the entire objects.

Here, the movable objects OBJm can be caused to perform return movement, and can be selected as an object to be caused to perform return movement. Therefore, in this non-limiting example, in response to transition of the game mode to the selection mode, the display form of the movable objects OBJm of the objects disposed in the virtual space is changed. This allows the user to perceive a choice of objects that can be designated as an object to be caused to perform return movement differently from other objects.

In FIG. 11, when objects (the movable objects OBJm) that can be selected as an object to be caused to perform return movement are rendered in a display form different from in the normal mode, a cursor C is displayed as a pointer for selecting and designating an object to be caused to perform return movement from the objects. The cursor C may be displayed and fixed at a predetermined position (e.g., the center of the screen) in the display 12, or may be displayed at any suitable position in the display 12 according to the user's operation. In the former case, the user can display and superimpose the cursor C at any suitable position in the virtual space by changing the position and/or orientation of a virtual camera for controlling a display range displayed on the display 12 according to the user's operation.

When one of the objects (the movable objects OBJm) that can be selected as an object to be caused to perform return movement is located at the position where the cursor C is displayed and superimposed, said object is designated as a designated object to be caused to perform return movement. For example, in the non-limiting example of FIG. 11, the movable object OBJm1 is located at the position where the cursor C is displayed and superimposed, and therefore, of the plurality of the movable objects OBJm1-OBJm displayed, the movable object OBJm1 is designated as a designated object.

After a designated object has thus been designated, a path display object T indicating a movement path on which the designated object is to perform return movement is disposed and displayed in the virtual space. The path display object T is a trajectory effect indicating where the designated object is to pass through and how the designated object is to move until the designated object returns to previous positions. The path display object T indicates a route on which the designated object is to move in return movement if the return movement is started, and orientations that the designated object is to take in the return movement. In this non-limiting example, for each of the movable objects OBJm, positions and orientations that the movable object OBJm has ever taken since a predetermined period of time before the current time, are stored, and a path display object T is generated based on the stored data. Specifically, it can be said that in the non-limiting example of FIG. 11, a predetermined period of time before the movable object OBJm1 is designated, the movable object OBJm1 was located at the position where a return orientation object Pe is displayed, and subsequently moved backward on the path indicated by the path display object T to reach the current position.

For example, the return movement of a designated object is such that the motion of the designated object that has been performed since a predetermined period of time (e.g., 20 seconds) before the current time is displayed backward (in a time-reversed fashion) as reverse motion from the current time. Therefore, the path display object T indicates the movement path of return movement in which the motion of a designated object that has been performed since a predetermined period of time before is performed backward (in a time-reversed fashion) from the current time until the predetermined period of time before.

Therefore, when a designated object is designated as described above, then if at least the predetermined period of time has already passed since the last movement of the designated object, no path is present for the return movement of the designated object, and therefore, no path display object T is displayed for the designated object. Even when a path display object T is displayed for a designated object in response to the designation of the designated object as described above, then if the designated object was moving midway the predetermined period of time before the current time, the path indicated by the path display object T extends up to the midway point. Furthermore, even when a path display object T is displayed for a designated object in response to the designation of the designated object as described above, then if time passes in a standby state in which the path display object T is being displayed, the path for return movement may gradually decrease. Thus, stored positions and orientations corresponding to the predetermined period of time continue to be updated while the path display object T is being displayed, and therefore, further previous positions and orientations in the path display object T are erased from the path while the path display object T is being displayed, so that the path is gradually changed and decreased.

It should be noted that recording of positions and orientations corresponding to each movable object OBJm corresponding to the predetermined period of time may be performed only while the movable object OBJm is moving. In that case, even when at least the predetermined period of time has currently passed since the last movement of a movable object OBJm, changes in position and orientation made during the last movement of the movable object OBJm are stored. Therefore, in that example, even if at least the predetermined period of time has currently passed since the last movement of a designated object when the designated object is designated, the path of return movement is present for the designated object, and therefore, a path display object T is displayed for the designated object.

Orientations of a designated object in return movement indicated by the path display object T are displayed which are taken by the designated object at predetermined time intervals during the return movement and at the end of the return movement. For example, in the non-limiting example of FIG. 11, in the path display object T, return orientation objects P1, P2, and P3 are displayed which indicate the orientations of the designated object at three time points during the return movement. In addition, in the non-limiting example of FIG. 11, in the path display object T, the return orientation object Pe is displayed which indicates the last position and orientation of the designated object at the end of the return movement.

In FIG. 12, when an operation of giving an instruction to start return movement of a designated object is performed, the designated object begins return movement and performs the immediately previous motion backward (in a time-reversed fashion). Specifically, based on data indicating a time series of positions (position data) and data indicating a time series of orientations (orientation data) which have been recorded since a predetermined period of time before the current time for each movable object OBJm, the designated object is moved, taking positions and orientations in the time series backward (in a time-reversed fashion).

As shown in FIG. 13, position data PD and orientation data AD indicating a time series of arrangements from the current time until a predetermined period of time before include positions and orientations corresponding to an elapsed time t until the current time for each movable object OBJm. In this non-limiting example, data indicating a time series of positions and orientations from the current time until a predetermined period of time before (e.g., 20 seconds before (elapsed time tmax)) (i.e., time-series data corresponding to the predetermined period of time immediately before the current time) is stored for each frame, which corresponds to a unit display time. It should be noted that the time intervals at which the position data and the orientation data are recorded may be other time intervals (e.g., one second) instead of a frame. It should be noted that data indicating a time series of positions and orientations from the current time until the predetermined period of time before may be recorded for objects disposed in a predetermined range of the virtual space. For example, position data PD and orientation data AD may be recorded for objects displayed on the display 12, objects disposed within a predetermined distance from the player character PC, objects disposed in a game world or game stage in which the player character PC is disposed, of a plurality of game worlds or game stages, etc.

In this non-limiting example, a designated object is caused to perform return movement in such a manner that the designated object returns to previously recorded positions and orientations sequentially backward (in a time-reversed manner) from the time point at which an operation of starting return movement is performed. For example, as return movement proceeds, positions and orientations that were recorded earlier, and are the most recent in the time series at current points during the return movement, are sequentially set as a target position and orientation in the return movement (i.e., stored positions and orientations are set as a target sequentially in reverse chronological order). As return movement proceeds, movement-related parameters for use in virtual physical calculation for causing the designated object to perform return movement to return to the target position and orientation set at each time point are calculated, and by using the parameters, the designated object is caused to perform return movement to return to the target position and orientation. As an example, the parameters are data indicating a velocity and angular velocity that are assigned to the designated object so that the designated object performs return movement to return to the target position and orientation set at the time point. As another example, the parameters may be data indicating an acceleration and angular acceleration that are assigned to the designated object so that the designated object performs return movement to return to the target position and orientation set at the time point.

It should be noted that when a designated object has done return movement, not all states of the designated object return to their previous states. Specifically, in the return movement, some transitionable states set for a designated object do not return to their previous states. Here, states in the virtual space in which characters including the player character PC and objects are disposed are updated based on virtual physical calculation. In addition to the physical calculation, states in the virtual space are updated based on state change calculation that changes states of objects in the virtual space, depending on the behavior of characters including the player character PC and surrounding conditions. Such state changes of objects including a designated object are made even when the designated object is performing return movement, irrespective of the previous states of the designated object.

In the above return movement, at the start of the return movement, the movement-related parameters are calculated, where the position and orientation of the designated object which were most recently recorded in time series with reference to the current position and orientation thereof (the position and orientation recorded one frame before in the case where data is stored on a frame-by-frame basis) are set as a target position and orientation in the return movement, and the designated object performs the return movement using the parameters. Thereafter, when the designated object has returned to the above target position and orientation, the movement-related parameters are calculated, where the position and orientation of the designated object which were most recently recorded in time series with reference to the above target position and orientation thereof (the next in reverse chronological order) (the position and orientation recorded another one frame before (i.e., two frames before the start of the return movement) in the case where data is stored on a frame-by-frame basis) are set as a target position and orientation in the return movement, and the designated object performs the return movement using the parameters. Finally, when the designated object has reached the goal of the return movement, i.e., the position and orientation recorded earliest in time series (i.e., the position and orientation recorded the predetermined period of time before, that is, the position and orientation stored at the elapsed time tmax), the designated object is disposed at rest at the final target position and orientation, and the return movement is ended.

It should be noted that as shown in FIG. 12, the path display object T may continue to be displayed while the designated object is performing return movement. In that case, a portion of the path on which the designated object has already moved in the return movement is erased, and only the remainder of the path on which the designated object has yet to move in the return movement continues to be displayed.

A remaining time indicator G that indicates the remaining time of return movement may be displayed while a designated object is performing the return movement. In that case, the remaining time indicator G displays the maximum remaining time (maximum scale) at the start of return movement, and thereafter, displays a reduced remaining time according to the elapsed time of the return movement.

Here, during the return movement performed using the above parameters, the designated object may fail to return to the target position and orientation set at a certain time point. For example, the designated object performing the return movement may be interfered with, e.g., may collide with another object or character, or may be affected by an environment in the virtual space, and therefore, may fail to return to a target position and orientation. In the situation where the designated object has not returned, at a certain time point, to the position and orientation to which the designated object should have returned at that time point, movement-related parameters that are used to cause the designated object in that situation to returned to the next target position and orientation are calculated with the timing of setting the next target position and orientation of the designated object, and the designated object performs return movement using the parameters. In other words, even if the designated object is interfered with during the return movement, the process of the return movement is continued. This allows the player to interfere in return movement, and therefore, can be utilized in game play, including movement of a player character using return movement.

It should be noted that when a designated object performing return movement collides with another object (or character), the state, existence, position, orientation, or the like of at least one of the colliding objects may be changed. As an example, the state of at least one of the objects may be changed (including disappearance) due to damage or the like caused by collision, or the position and orientation of at least one of the objects may be affected, depending on movement parameters at the time of collision.

At the end of return movement, a designated object may be stopped and disposed at a position which is midway through the immediately previous movement, and therefore, the position may, for example, be a position in the air in the virtual space, which causes a situation that the designated object cannot be disposed at rest. In the case where return movement is ended with a designated object disposed at a position where the designated object is not allowed to be at rest, the designated object may subsequently be moved from said position based on physical calculation set for the virtual space. As an example, in the case where return movement is ended with a designated object disposed at a position in the air in the virtual space, the designated object may be moved such that the designated object goes into free fall from the position in the air in the virtual space.

The return movement of a designated object may be allowed to end halfway, in response to the user's operation of giving an instruction to cancel the return movement during the return movement, or depending on the state of the designated object during the return movement. In that case, even if the designated object has failed to return to the position and orientation recorded the predetermined period of time before as a result of virtual physical calculation, the return movement is ended. In the case where return movement is allowed to end halfway according to the user's operation of giving an instruction to cancel the return movement, the return movement of a designated object is stopped halfway in response to the user's operation of giving an instruction to cancel the return movement, and the designated object is caused to be at rest at that time point. In that case, the designated object that has stopped the return movement may subsequently be moved from the stop position based on a physical law set in the virtual space. If a state change occurs such that a designated object disappears halfway through return movement, the return movement may be ended at that time and the designated object may be removed from the virtual space. In that case, the return movement of a designated object is ended not only when the designated object takes the position and orientation recorded the predetermined period of time before, but also when the user's operation gives an instruction to cancel the return movement or when the designated object disappears during the return movement.

Thus, a designated object selected according to the user's operation performs return movement sequentially backward (in a time-reversed fashion) based on parameters related to a time series of positions and orientations recorded at time intervals corresponding to the predetermined period of time immediately before the current time, as a target. It should be noted that a designated object is not forced to return to a previous position and orientation, and is only given parameters for movement of returning to a previous position and orientation. The actual behavior is determined based on physical calculation, and therefore, even if there are other factors in a game, different behavior may occur, depending on physical calculation. In other words, a designated object may be interfered with by other objects or characters in the virtual space during return movement. That is, not only a designated object performing return movement, but also other objects and characters in the virtual space, are moved during the return movement based on physical calculation. Thus, the return movement does not simply force the designated object to return to a previous state. In addition, the transitionable states of a designated object performing return movement are not caused to return to a previous state. A transition process may be executed even during return movement irrespective of a previous state, and a motion different from a previous motion may occur halfway through the return movement, which is then not completed. In this regard, the return movement is different from representation of a simple reverse motion of a designated object.

Figure 14:
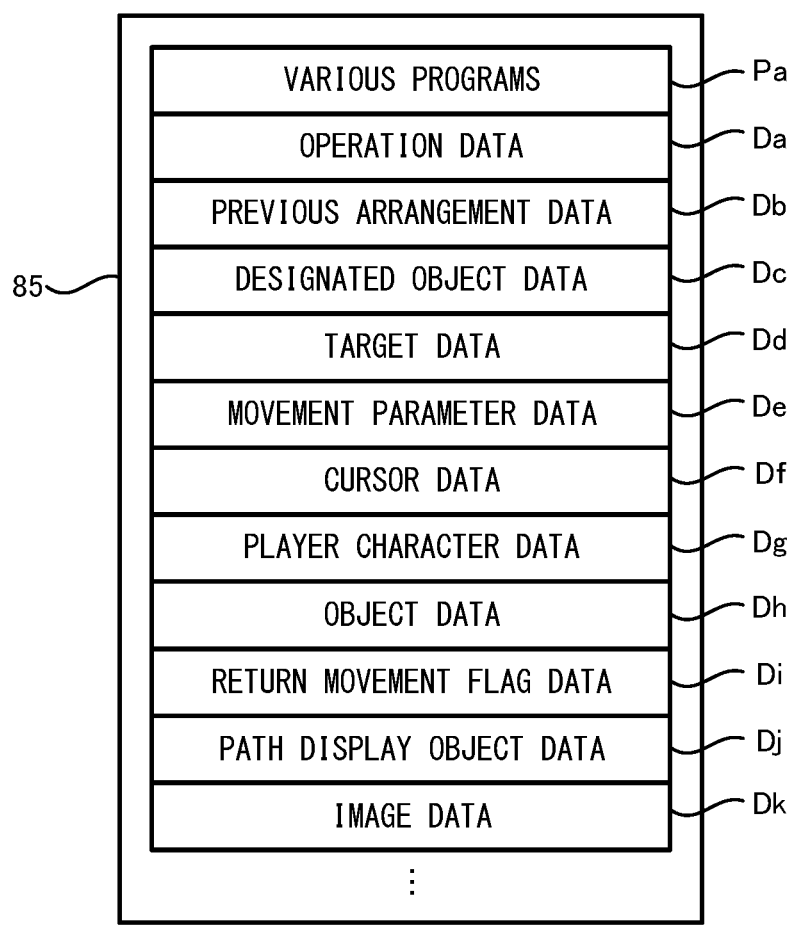
FIG. 14 is a diagram showing a non-limiting example of a data area contained in a DRAM 85 of the main body apparatus 2 in the present non-limiting example.

Next, a non-limiting example of a specific process that is executed by the game system 1 in this non-limiting example will be described with reference to FIGS. 14-16. FIG. 14 is a diagram showing a non-limiting example of a data area contained in the DRAM 85 of the main body apparatus 2 in this non-limiting example. Note that in addition to the data of FIG. 14, the DRAM 85 also stores data that is used in other processes, which will not be described in detail.

Various programs Pa that are executed in the game system 1 are stored in a program storage area of the DRAM 85. In this non-limiting example, the programs Pa include an application program (e.g., a game program) for performing information processing based on data obtained from the left controller 3 and/or the right controller 4, and the main body apparatus 2. Note that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

Various kinds of data that are used in processes such as an information process that are executed in the game system 1 are stored in a data storage area of the DRAM 85. In this non-limiting example, the DRAM 85 stores operation data Da, previous arrangement data Db, designated object data Dc, target data Dd, movement parameter data De, cursor data Df, player character data Dg, object data Dh, return movement flag data Di, path display object data Dj, image data Dk, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each button, an analog stick, a touch panel, or each sensor) (specifically, information about an operation, and the result of detection by each sensor). In this non-limiting example, operation data is obtained from each of the left controller 3 and/or the right controller 4 and the main body apparatus 2 through wireless communication. The obtained operation data is used to update the operation data Da as appropriate. Note that the operation data Da may be updated for each frame that is the cycle of a process executed in the game system 1, or may be updated each time operation data is obtained.

The previous arrangement data Db is arrangement data indicating a time series of arrangements of each movable object OBJm from the current time to a predetermined period of time before, i.e., data indicating a time series of previous positions and orientations. For example, the previous arrangement data Db indicates positions and orientations corresponding to elapsed times until the current time for each movable object OBJm. That is, data indicating a time series of positions and orientations from the current time until a predetermined period of time before (e.g., 20 seconds before) (i.e., time-series data corresponding to a predetermined period of time immediately before the current time) is stored on a frame-by-frame basis, where a frame is a unit time of display.

The designated object data Dc indicates a designated object selected by the user's operation. For example, the designated object data Dc indicates information for identifying the designated object, the position, orientation, and state of the designated object, and the like.

The target data Dd indicates target positions and orientations that are sequentially set when the designated object performs return movement. The movement parameter data De indicates movement-related parameters that are used in virtual physical calculation so as to cause the designated object to return to the target positions and orientations.

The cursor data Df indicates a position in the virtual space where the cursor C is displayed and superimposed when the designated object is designated.

The player character data Dg indicates the position and orientation of the player character PC disposed in the virtual space, the movement and state of the player character PC in the virtual space, and the like. The object data Dh the type, position, orientation, state, and the like of each object disposed in the virtual space.

The return movement flag data Di indicates the state of a return movement flag which is set "on" when the designated object is during return movement.

The path display object data Dj indicates the shape, position, and orientation of the path display object T.

The image data Dk is for displaying an image (e.g., an image of a character or object, an image of the virtual space, a background image, etc.) on a display screen (e.g., the display 12 of the main body apparatus 2).

Next, a specific non-limiting example of an information process in this non-limiting example will be described with reference to FIGS. 15 and 16. FIG. 15 is a flowchart showing a non-limiting example of an information process that is executed by the game system 1. FIG. 16 is a subroutine showing a specific non-limiting example of a return movement process that is performed in step S127 shown in FIG. 15. In this non-limiting example, a series of processes shown in FIGS. 15 and 16 are performed by the processor 81 executing a predetermined application program (game program) included in the programs Pa. The information process of FIGS. 15 and 16 is started with any suitable timing.

Figure 15:
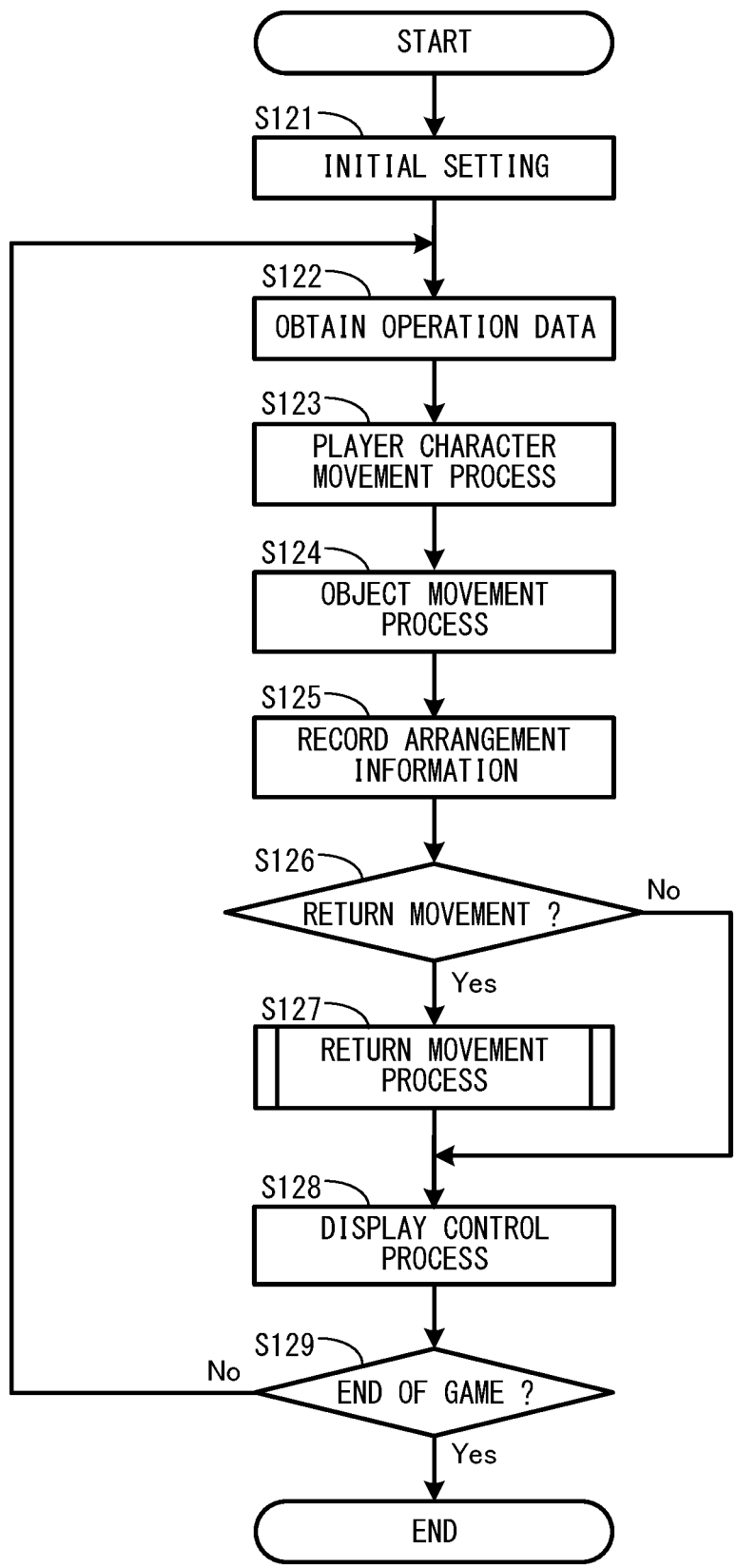
FIG. 15 is a flowchart showing a non-limiting example of an information process that is executed by a game system 1.
Figure 16:
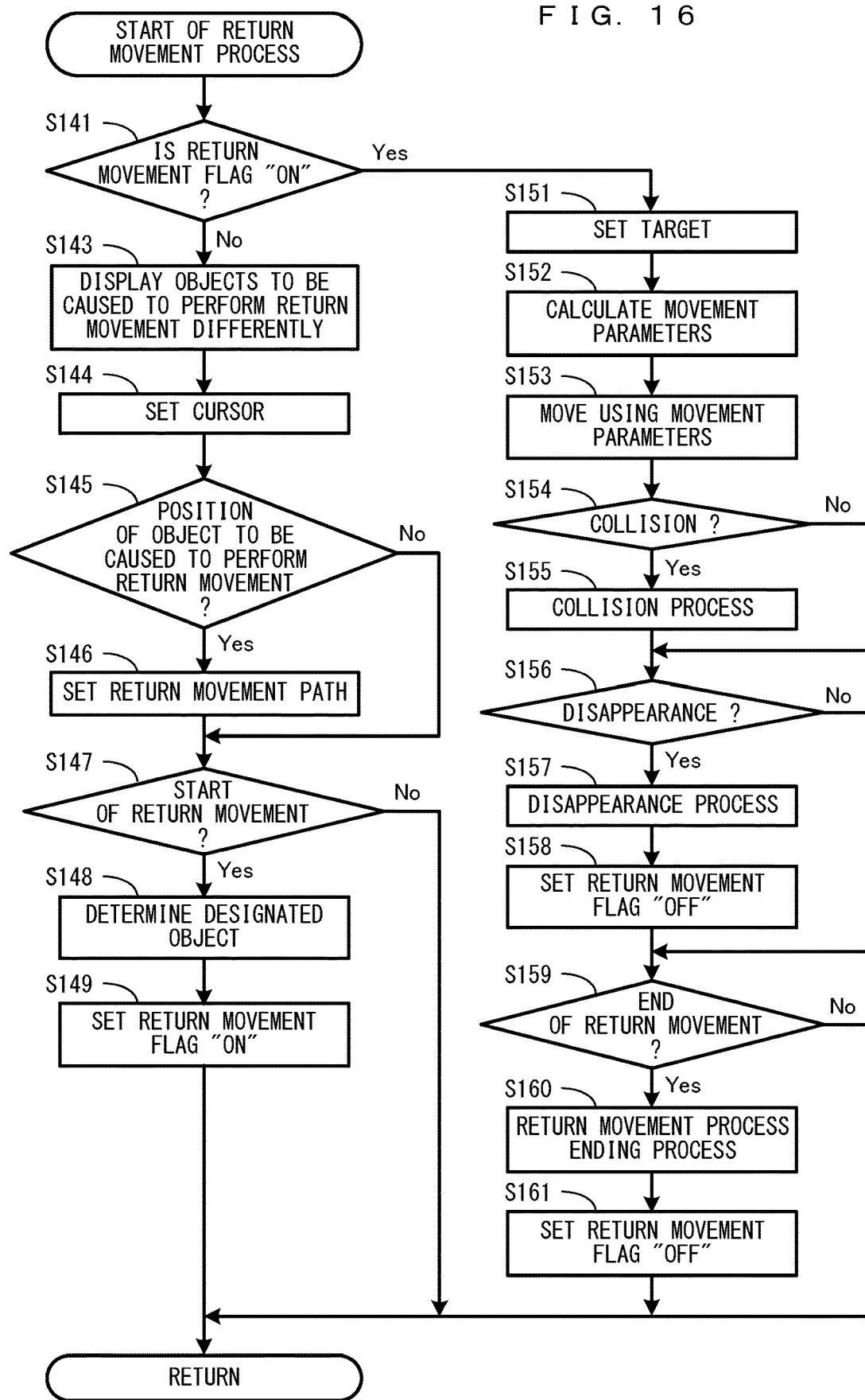
FIG. 16 is a subroutine showing a specific non-limiting example of a return movement process performed in step S127 shown in FIG. 15.

Note that the steps in the flowchart of FIGS. 15 and 16, which are merely illustrative, may be executed in a different order, or another step may be executed in addition to (or instead of) each step, if a similar effect is obtained. In this non-limiting example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 15 and 16 may be executed by a plurality of information processing apparatuses including the main body apparatus 2 cooperating with each other.

In FIG. 15, the processor 81 performs initial setting for the information process (step S121), and proceeds to the next step. For example, in the initial setting, the processor 81 initializes parameters for performing processes described below. For example, the processor 81 initially disposes the player character PC and a plurality of objects in the virtual space based on predetermined settings for the virtual space, and initially sets the player character data Dg and the object data Dh. The processor 81 updates the previous arrangement data Db using the initially set positions and orientations for movable objects OBJm that can be selected as an object to be caused to perform return movement, of the plurality of objects.

Next, the processor 81 obtains operation data from each of the left controller 3, the right controller 4, and/or the main body apparatus 2, and updates the operation data Da (step S122), and proceeds to the next step.

Next, the processor 81 moves the player character PC in the virtual space (step S123), and proceeds to the next step. For example, the processor 81 moves the player character PC based on the operation data Da obtained in step S122, and updates the player character data Dg. The processor 81 also moves the player character PC disposed in the virtual space based on virtual physical calculation in the player and the virtual space depending on the movement of the player character PC and surrounding conditions, and updates the player character data Dg. Furthermore, the processor 81 changes the state of the player character PC based on state change calculation that changes the state of the player character PC, and updates the player character data Dg. It should be noted that a processor that controls a player character in the virtual space based on the user's operation input corresponds to, for example, the processor 81 that executes step S123. A processor that updates the state in the virtual space including the player character based on virtual physical calculation corresponds to, for example, the processor 81 that executes step S123.

Next, the processor 81 moves each object in the virtual space (step S124), and proceeds to the next step. For example, the processor 81 moves each object disposed in the virtual space based on the movement of the player character PC, the movements of the object itself and other objects, and virtual physical calculation in the virtual space, and updates the object data Dh. The processor 81 also changes the state of each object based on state change calculation that changes the state of each object, and updates the object data Dh. It should be noted that the movement of an object designated as a designated object and performing return movement is controlled in a return movement process of step S127 described below, and therefore, is excluded in the object movement process of step S124. It should be noted that a processor that updates the state in the virtual space including objects based on virtual physical calculation corresponds to, for example, the processor 81 that executes step S124. A processor that updates the state in the virtual space based on physical calculation as well as state change calculation that changes the states of objects in the virtual space, depending on the behavior of a player character and surrounding conditions corresponds to, for example, the processor 81 that executes step S124.

Next, the processor 81 records arrangement information of objects (step S125), and proceeds to the next step. For example, for movable objects OBJm that can be selected as an object to be caused to perform return movement, of a plurality of objects, the processor 81 additionally records a position and an orientation at each current time point as most recent data into the previous arrangement data Db, and updates elapsed times already stored in the data with times that have elapsed since the time of the recording. The processor 81 also deletes, from the previous arrangement data Db, the arrangement data of an object that was recorded at least the predetermined period of time before, in the data stored in the previous arrangement data Db. It should be noted that a processor that records the positions and orientations of objects in a predetermined range of the virtual space into a memory at time intervals sequentially in time corresponds to, for example, the processor 81 that executes step S125.

Next, the processor 81 determines whether or not to perform return movement (step S126). For example, the processor 81 determines a current game mode based on the user's operation. If the current game mode is the selection mode in which an object to be caused to perform return movement (designated object) can be selected or the in-return movement mode in which return movement is being performed, the result of the determination in step S126 by the processor 81 is positive. If the current game mode is the normal mode in which selection of a designated object to be caused to perform return movement is disabled, and return movement is not being performed, the result of the determination in step S126 by the processor 81 is negative. If the processor 81 determines to perform return movement, the processor proceeds to step S127. Meanwhile, if the processor 81 does not determine to perform return movement, the processor proceeds to step S128.

In step S127, the processor 81 executes a return movement process, and proceeds to step S128. The return movement process executed in step S127 will now be described with reference to FIG. 16. It should be noted that a processor that changes movement-related parameters used in virtual physical calculation such that a designated object selected based on an operation input, of objects, is caused to perform return movement so as to return to positions and orientations that were previously recorded into a memory, sequentially backward (in a time-reversed fashion) from the time of giving an instruction to start the return movement based on an operation input corresponds to, for example, the processor 81 that executes step S127. A processor that causes the game mode to transition from the normal mode in which selection of a designated object is disabled to the selection mode in which selection of a designated object is enabled, in response to an instruction to start selection based on an operation input, corresponds to, for example, the processor 81 that executes steps S126 and S127.

In FIG. 16, the processor 81 determines whether or not the return movement flag is "on" (step S141). For example, if the processor 81 determines, by referencing the return movement flag data Di, that the return movement flag is "on," the result of the determination in step S141 by the processor 81 is positive. If the return movement flag is "off," the processor 81 proceeds to step S143. Meanwhile, if the return movement flag is "on," the processor 81 proceeds to step S151.

In step S143, the processor 81 changes an object to be caused to perform return movement into a display form that allows the object to be distinguished from other objects, and proceeds to the next step. For example, the processor 81 changes the color of the entire movable objects OBJm to be caused to perform return movement, and thereby renders objects that can be selected as a designated object, in a display form different from in the normal mode, (see FIG. 10).

Next, the processor 81 sets a cursor (step S144), and proceeds to the next step. For example, the processor 81 sets a cursor such that the cursor C is displayed at the center of the display screen of the display 12, and updates the cursor data Df (see FIG. 10).

Next, the processor 81 determines whether or not an object to be caused to perform return movement is located at the position where the cursor C is displayed and superimposed (step S145). If an object to be caused to perform return movement is located at the position where the cursor C is displayed and superimposed (see FIG. 11), the processor 81 proceeds to step S146. Meanwhile, if no object to be caused to perform return movement is located at the position where the cursor C is displayed and superimposed, the processor 81 proceeds to step S147.

In step S146, the processor 81 displays a path display object indicating a movement path on which an object to be caused to perform return movement located at the position where the cursor C is displayed and superimposed is to move during return movement, and proceeds to step S147. For example, the processor 81 references the previous arrangement data Db of an object selected as an object to be caused to perform return movement, and extracts the positions and orientations of the object from the current time until a predetermined period of time before (e.g., 20 seconds before). The processor 81 calculates a movement path that is a sequence of positions arranged in chronological order until the predetermined period of time before, sets return orientation objects P on the movement path using orientations taken at predetermined time intervals occurring until the predetermined period of time before and the final orientation of the return movement taken the predetermined period of time before, to produce a path display object T (see FIG. 11), and updates the path display object data Dj. It should be noted that a processor that disposes, in the virtual space, a path display object for indicating a movement path on which a designated object is to move in return movement, based on positions and orientations stored in a memory, corresponds to, for example, the processor 81 that executes step S146.

In step S147, the processor 81 determines whether or not to start return movement. For example, if the processor 81 determines, by referencing the operation data Da, that the user has performed an operation to start return movement, the result of the determination in step S147 by the processor 81 is positive. If the processor 81 determines to start return movement, the processor 81 proceeds to step S148. Meanwhile, if the processor 81 does not determine to start return movement, the subroutine is ended.

In step S148, the processor 81 determines an object that is currently selected as an object to be caused to perform return movement, as a designated object, and proceeds to the next step. For example, the processor 81 updates the designated object data Dc using information about the designated object thus determined (information identifying the object, the current position, orientation, and state of the object, etc.). The processor 81 also removes the cursor C from the virtual space, and initializes (e.g., nulls) the cursor data Df. It should be noted that a processor that, if there is, in the selection mode, an object that can be selected as a designated object, at the display position of a pointer located at a predetermined position in the screen, selects the object as a designated object, corresponds to, for example, the processor 81 that executes step S148.

Next, the processor 81 sets the return movement flag "on" (step S149), and ends the subroutine. For example, the processor 81 sets the return movement flag "on," and updates the return movement flag data Di. It should be noted that a processor that, if there is a designated object, causes the designated object to start return movement when an instruction to start is given, corresponds to, for example, the processor 81 that executes step S149.

Meanwhile, if the processor 81 determines in step S141 that the return movement flag is "on," the processor 81 sets a target for return movement (step S151), and proceeds to the next step. For example, as the return movement of the designated object proceeds, the processor 81 sequentially sets positions and orientations of the designated object that were recorded earlier and are the most recent at each current time point in the time series as a target position and orientation for the return movement, and updates the target data Dd. Specifically, the processor 81 references the previous arrangement data Db of a designated object to be caused to perform return movement, and sets the most recent position and orientation, of the positions and orientations of the object from the current time until a predetermined period of time before (e.g., 20 seconds before), as an initial target position and orientation. Thereafter, when the elapsed time from the start of the return movement becomes equal to an elapsed time stored in the previous arrangement data Db in association with the arrangement information set as the target, the next position and orientation that were recorded earlier as the previous arrangement data Db, and are the most recent in the time series at the new current point during the return movement, are set as a new target position and orientation for the return movement, and updates the target data Dd. Thus, targets sequentially set while the designated object is performing return movement are set according to elapsed time such that the designated object returns to previously recorded positions and orientations sequentially backward (in a time-reversed fashion) from the time that an operation of starting return movement is performed.

Next, the processor 81 calculates movement parameters for causing the designated object to perform return movement (step S152), and proceeds to the next step. For example, the processor 81 calculates movement-related parameters that are used in virtual physical calculation for causing the designated object to transition from the current position and orientation to a target position and orientation set in the target data Dd, and updates the movement parameter data De with said parameters. As an example, the processor 81 calculates, as the movement parameters, a velocity and angular velocity that are applied to the designated object in the virtual space so that the designated object reaches from the current position to the target. As another example, the processor 81 calculates, as the movement parameters, an acceleration and angular acceleration that are applied to the designated object in the virtual space so that the designated object reaches from the current position to the target.

Next, the processor 81 moves the designated object based on the parameters calculated in step S152 (step S153), and proceeds to the next step. For example, the processor 81 changes the current position and orientation of the designated object indicated by the designated object data Dc, in the virtual space, based on the parameters calculated in step S152, and updates the designated object data Dc with the changed position and orientation. The processor 81 also changes the state of the designated object performing the return movement, based on state change calculation that changes the current state of the designated object indicated by the designated object data Dc in the virtual space, and updates the designated object data Dc. It should be noted that a processor that updates the state in the virtual space including a designated object based on virtual physical calculation corresponds to, for example, the processor 81 that executes step S153.

It should be noted that the path display object T may continue to be displayed while the designated object is performing return movement. In that case, a portion of the path on which the designated object has already moved in the return movement may be erased, and only the remainder of the path on which the designated object has yet to move in the return movement may continue to be displayed (see FIG. 12). In that case, in step S153, the processor 81 deletes a portion of the path on which the designated object has already moved in the return movement, and updates the path display object data Dj. In the case where the remaining time indicator G is displayed while a designated object is performing return movement, the processor 81 causes the remaining time indicator G to display the maximum remaining time (maximum scale) at the start of the return movement, and thereafter, to display a reduced remaining time according to the elapsed time of the return movement.

Next, the processor 81 determines whether or not the designated object performing the return movement has collided with another object or character (step S154). For example, the processor 81 determines whether or not there is a collision with the designated object, using the designated object data Dc, the player character data Dg, and the object data Dh. If the designated object performing the return movement has collided with another object or character, the processor 81 proceeds to step S155. Meanwhile, if the designated object performing the return movement has not collided with another object or character, the processor 81 proceeds to step S156.

In step S155, the processor 81 performs a collision process on both of the colliding objects, and proceeds to step S156. For example, the processor 81 changes the state, existence, position, and orientation, etc., of at least one of the colliding objects, and updates the designated object data Dc, the player character data Dg, and the object data Dh. As an example, the processor 81 changes the state of at least one of the colliding objects due to damage or the like caused by the collision (the state change includes disappearance), and updates the designated object data Dc, the player character data Dg, and/or the object data Dh with the changed state. As another example, the processor 81 changes the position and orientation of at least one of the colliding objects, depending on the movement parameters during the collision, and updates the designated object data Dc, the player character data Dg, and/or the object data Dh with the changed position and orientation. It should be noted that a processor that updates the state in the virtual space including a designated object and another object based on virtual physical calculation corresponds to, for example, the processor 81 that executes step S156.

In step S156, the processor 81 determines whether or not the designated object performing the return movement has disappeared from the virtual space. As an example, in step S155, if the state of the designated object performing the return movement has changed so that the designated object disappears from the virtual space, the result of the determination in step S156 by the processor 81 is positive. If the designated object has disappeared from the virtual space, the processor 81 proceeds to step S157. Meanwhile, if the designated object has not disappeared from the virtual space, the processor 81 proceeds to step S159.

In step S157, the processor 81 performs a disappearance process of causing the designated object to disappear from the virtual space, and proceeds to the next step. For example, the processor 81 removes the designated object from the virtual space, and initializes (e.g., nulls) the designated object data Dc, the target data Dd, and the movement parameter data De, and the previous arrangement data Db and the object data Dh related to the designated object. In the case where the designated object is performing the return movement while the path display object T is being displayed, the processor 81 erases the path display object T from the virtual space, and initializes (e.g., nulls) the path display object data Dj. Thus, the return movement of the designated object ends with these disappearance processes.

Next, the processor 81 causes the game mode to transition to the normal mode, and sets the return movement flag "off" (step S158), and proceeds to step S159. For example, the processor 81 sets the return movement flag "off," and updates the return movement flag data Di.

In step S159, the processor 81 determines whether or not the return movement has ended. For example, if the return movement toward the position and orientation recorded the predetermined period of time before has been completed, or if the user's operation indicating an instruction to cancel the return movement has been performed during the return movement, the processor 81 determines that the executed return movement has ended. If the return movement has ended, the processor 81 proceeds to step S160. Meanwhile, if the return movement has not ended, the processor 81 ends the subroutine. It should be noted that a processor that, if a return movement toward the position and orientation recorded in a memory the predetermined period of time before has been completed, or if the user's operation indicating an instruction to cancel a return movement has been performed during the return movement, ends the return movement, corresponds to, for example, the processor 81 that executes step S159.

In step S160, the processor 81 performs a return movement ending process, and proceeds to the next step. For example, the processor 81 causes the designated object to stop at the current position in the virtual space, and updates the object data Dh of the designated object with the current position, orientation, and state, etc., of the designated object. The processor 81 also initializes (e.g., nulls) the designated object data Dc, the target data Dd, and the movement parameter data De, and the previous arrangement data Db related to the designated object that has ended the return movement. In the case where the designated object has been performing the return movement while the path display object T is being displayed, the processor 81 erases the path display object T from the virtual space, and initializes (e.g., nulls) the path display object data Dj. Thus, the return movement of the designated object ends with these return movement ending processes, and the movement of the object after the end of the return movement is performed by step S124. It should be noted that a processor that, if a return movement toward the position and orientation recorded in a memory the predetermined period of time before has been completed, or if the user's operation indicating an instruction to cancel a return movement has been performed during the return movement, ends the return movement, corresponds to, for example, the processor 81 that executes step S160.

Next, the processor 81 causes the game mode to transition to the normal mode, and sets the return movement flag "off" (step S161), and ends the subroutine. For example, the processor 81 sets the return movement flag "off," and updates the return movement flag data Di.

Referring back to FIG. 15, in step S128, the processor 81 performs a display control process, and proceeds to the next step. For example, the processor 81 disposes objects including the player character PC and the designated object, and the path display object T, in the virtual space, based on the designated object data Dc, the cursor data Df, the player character data Dg, the object data Dh, and the path display object data Dj. The processor 81 also sets the position and/or orientation of a virtual camera for generating a display image, based on the operation data Da, and disposes the virtual camera in the virtual space. Thereafter, the processor 81 generates an image of the virtual space as viewed from the set virtual camera, and performs control to display the virtual space image on the display 12. It should be noted that a processor that controls the virtual camera based on an operation input corresponds to, for example, the processor 81 that executes step S128.

Next, the processor 81 determines whether or not to end the game process (step S129). The condition for ending the game process in step S129 is, for example, that the condition for ending the game process is satisfied, that the user has performed an operation of ending the game process, etc. If the processor 81 does not determine to end the game process, the processor 81 returns to step S122, and repeats the process. If the processor 81 determines to end the game process, the processor 81 ends the process of the flowchart. Thereafter, steps S122-S129 are repeatedly executed until the processor 81 determines, in step S129, to end the game process.

Thus, in this non-limiting example, a game can be achieved in which a reverse motion of a designated object with the designated object returning to previous positions, orientations, and the like, can be utilized.

It should be noted that in the above non-limiting example, in the return movement of a designated object, the designated object is moved to return to previously recorded positions and orientations sequentially backward (in a time-reversed fashion) from the time point that an instruction to start the return movement is given. Parameters of a designated object to be returned are not limited to the above parameters. For example, in the return movement of a designated object, the designated object may be moved to return at least previous positions and orientations as a target.

As an example, in the case where a designated object that performs return movement is in the shape of a body rotating about a predetermined axis such as a circular cylinder, cone, truncated cone, disk, ring, barrel, or hollow cylinder, the shape of the object itself remains unchanged even when the object rotates about the axis. Therefore, instead of using the direction about such an axis in which the object faces, as a target of return movement, the direction of the axis in the virtual space may be used as the orientation of the object, and the object may be caused to return to the position and orientation as a target. In the case of objects having a shape other than the above rotating body shape, the direction of an axis specified for said object in the virtual space may be used as the orientation, and the object may be caused to return to positions and orientations as a target of return movement, instead of using, as a target, the direction in which the object faces.

The concept of the orientation of an object in the virtual space may include the direction in which the object faces in the virtual space. For example, at least two axes (e.g., the upward axis and forward axis of an object, or three orthogonal axes) may be defined for an object to be caused to perform return movement, and the orientation of the object may be specified using the directions of the two axes in the virtual space. In that case, the direction in which the object faces (e.g., the forward direction of the object relative to the upward, downward, leftward, rightward, forward, and backward directions in the virtual space) is controlled by controlling the position and orientation of the object during return movement. Thus, in this non-limiting example, the return movement of a designated object can be controlled using the orientation and position of the object including the concept of the direction in which the object faces, as a target.

In the above non-limiting example, the positions and orientations of an object from the current time until a predetermined period of time before are stored, and the positions and orientations corresponding to the predetermined period of time are updated as time passes, and therefore, positions and orientations recorded further previously are sequentially deleted earlier. Alternatively, the stored positions and orientations may not be updated while the object is at rest after stopping movement. In that case, the stored positions and orientations corresponding to the predetermined period of time are those taken by the object during the last movement. In other words, return movement can be performed using the most recent movement. For example, even when it takes time to perform an operation of designating a designated object and starting return movement, return movement can still be performed.

In the above non-limiting example, information about an object previously recorded backward from the time of giving an instruction to start return movement is the most recent information corresponding a predetermined period of time (e.g., 20 seconds) immediately before the time of giving the start instruction. Alternatively, information about an object from the start of a game until the current time may all be stored. In addition, information about an object previously recorded backward from the time of giving an instruction to start return movement may be stored for objects disposed in a predetermined range in the virtual space, or for all objects disposed in the virtual space.

The game system 1 may be any suitable apparatus, including a handheld game apparatus, or any suitable handheld electronic apparatus (a personal digital assistant (PDA), mobile telephone, personal computer, camera, tablet computer, etc.), etc. In that case, an input apparatus for performing an operation of moving an object may be, instead of the left controller 3 or the right controller 4, another controller, mouse, touchpad, touch panel, trackball, keyboard, directional pad, slidepad, etc.

In the foregoing, all process steps in the above information process are performed in the game system 1. Alternatively, at least a portion of the process steps may be performed in another apparatus. For example, when the game system 1 can also communicate with another apparatus (e.g., another server, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above non-limiting example, the information process can be performed by the processor 81 of the game system 1 executing a predetermined program. Alternatively, all or a portion of the above process may be performed by a dedicated circuit included in the game system 1.

Here, according to the above non-limiting variation, this non-limiting example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and this non-limiting example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement this non-limiting example.

The above program may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example and common technical knowledge. It should be understood throughout the present specification that expression of a singular form includes the concept of its plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example pertain. If there is any inconsistency or conflict, the present specification (including the definitions) shall prevail.

As described above, this non-limiting example is applicable as a game program, game apparatus, game system, and game processing method, etc., that can utilize a reverse motion while causing an object in a virtual space to return to previous positions, orientations, and the like of the object.

What is claimed is:

1. A non-transitory computer-readable storage medium having stored therein a game program executable by a computing device that includes at least one hardware processor, wherein the game program is configured to cause the hardware processor to perform operations comprising:
   controlling a player character in a virtual space based on operation input;
   recording, during a first time period, instances of position and orientation data for each of a plurality of virtual objects that are moving within the virtual space, wherein the instances of position and orientation data for each one of the plurality of virtual objects are stored in a chronological order;

based on a triggering instruction, setting, for a designated object of the plurality of virtual objects, movement-related parameters used in execution of a virtual physical calculation that includes return movement processing for the designated object by using, over a second time period that is subsequent the first time period, the instances of position and orientation data that have been recorded for the designated object in a reverse chronological order to control, at least in part, how the designated object is to be located and how the designated object is to be oriented within the virtual space during the second time period; and repeatedly, over the second time period, displaying an updated state of the virtual space that includes the player character, the designated object, and/or other ones of the plurality of virtual objects based on the execution of the virtual physical calculation and the set movement-related parameters.

2. The non-transitory computer-readable storage medium according to claim 1, wherein the operations further comprise:

at each current point during the return movement: 1) setting a target position and orientation based on at least one previously recorded instance of position and orientation data, and 2) changing, for the designated object, a velocity and angular velocity or an acceleration and angular acceleration such that the designated object returns to the set target position and orientation.

3. The non-transitory computer-readable storage medium according to claim 1, wherein each instance of the position and orientation data for each of the plurality of virtual objects corresponds to a frame of execution and each instance is stored on a frame-by-frame basis.

4. The non-transitory computer-readable storage medium according to claim 1, wherein the instances of the position and orientation data for the designated object are recorded into memory at time intervals in the first time period that is immediately before when the triggering instruction is triggered.

5. The non-transitory computer-readable storage medium according to claim 4, wherein the operations further comprise:

ending the return movement of the designated object based on completion of the return movement for the designated object or to an instruction to cancel the return movement by operation input.

6. The non-transitory computer-readable storage medium according to claim 1, wherein the operations further comprise:

displaying a movement path, based on recorded instances of position and orientation data for the designated object, positions and orientations that have been recorded for the designated object, on which the designated object is indicated to perform for the return movement.

7. The non-transitory computer-readable storage medium according to claim 1, each instance of the position and orientation data for the designated object corresponds to a different frame of execution and each instance is stored on a frame-by-frame basis, the operations further comprising:

based on selection of the designated object, displaying a movement path for the designated object based on the stored positions and orientations for the designated object;

at each frame during the return movement: 1) setting a target position and orientation based on at least one previously recorded instance of position and orientation data, and 2) changing, for the designated object, the movement-related parameter such that the designated object returns to the target position and orientation that has been set; and ending the return movement of the designated object based on completion of the return movement for the designated object or to an instruction to cancel the return movement by operation input.

8. The non-transitory computer-readable storage medium according to claim 7, wherein the movement-related parameter includes at least one of: 1) a velocity and angular velocity; and 2) an acceleration and angular acceleration.

9. The non-transitory computer-readable storage medium according to claim 1, wherein the operations further comprise:

switching, based on received input, from a normal mode in which selection of the designated object is disabled to a selection mode in which selection of the designated object is enabled; and in the selection mode, rendering an object selectable as the designated object, in a display form that is different than what is rendered in the normal mode for the designated object.

10. The non-transitory computer-readable storage medium according to claim 1, wherein the operations further comprise:

changing, during the return movement processing of the designated object, a state of the designated object to be a new state, wherein the new state was not used for the designated object during the first time period.

11. The non-transitory computer-readable storage medium according to claim 10, wherein the new state includes a disappearance state of the designated object, wherein the operations further comprising:

based on changing the state of the designated object to the disappearance state, ending the return movement processing for the designated object.

12. The non-transitory computer-readable storage medium according to claim 1, wherein instances of position and orientation data are only recorded for future return movement processing in connection with those virtual objects that are moving within the virtual space.

13. The non-transitory computer-readable storage medium according to claim 1, wherein the recording of the instances of position and orientation data for each of the plurality of virtual objects during the first time period is further based on each corresponding one of the plurality of virtual objects moving within the virtual space.

14. The non-transitory computer-readable storage medium according to claim 13, wherein position and orientation data for those virtual objects within the virtual space that are stationary is not recorded for return movement processing.

15. The non-transitory computer-readable storage medium according to claim 1, during the second time period and while the return movement processing for the designated object is being performed, movement and/or processing for other ones of the plurality virtual objects does not use corresponding instances of position and orientation data in processing for those ones of the plurality of virtual objects.

16. A game processing method that is performed on an information processing apparatus that includes at hardware processor, the game processing method comprising:
- controlling a player character in a virtual space based on operation input;
- storing, during a first time period, instances of position and orientation data for each of a plurality of virtual objects that are moving within the virtual space, wherein the instances of position and orientation data for each one of the plurality of virtual objects are stored in a chronological order;
- based on a triggering instruction, setting, for a designated object of the plurality of virtual objects, movement-related parameters used in execution of a virtual physical calculation that includes return movement processing for the designated object by using, over a second time period that is subsequent the first time period, the instances of position and orientation data that have been recorded for the designated object in a reverse chronological order to control, at least in part, how the designated object is to be located and how the designated object is to be oriented within the virtual space during the second time period; and
- repeatedly, over the second time period, displaying an updated state of the virtual space that includes the player character, the designated object, and/or other ones of the plurality of virtual objects based on the execution of the virtual physical calculation and the set movement-related parameters.

17. The game processing method according to claim 16, wherein the operations further comprise:
- at each current point during the return movement: 1) setting a target position and orientation based on at least one previously recorded instance of position and orientation data, and 2) changing, for the designated object, a velocity and angular velocity or an acceleration and angular acceleration such that the designated object returns to the set target position and orientation.

18. The game processing method according to claim 16, wherein each instance of the position and orientation data for each of the plurality of virtual objects corresponds to a frame of execution and each instance is stored on a frame-by-frame basis.

19. The game processing method according to claim 16, wherein
- the instances of the position and orientation data for the designated object are recorded into memory at time intervals in the first time period that is immediately before when the triggering instruction is triggered.

20. The game processing method according to claim 19, wherein the operations further comprise:
- ending the return movement of the designated object based on completion of the return movement for the designated object or to an instruction to cancel the return movement by operation input.

21. The game processing method according to claim 16, wherein the operations further comprise:
- displaying a movement path, based on the stored instances of position and orientation data for the designated object, on which the designated object is indicated to perform for the return movement.

22. The game processing method according to claim 16, each instance of the position and orientation data for the designated object corresponds to a different frame of execution and each instance is stored on a frame-by-frame basis, the operations further comprising:
- based on selection of the designated object, displaying a movement path for the designated object based on the stored positions and orientations for the designated object;
- at each frame during the return movement: 1) setting a target position and orientation based on at least one previously recorded instance of position and orientation data, and 2) changing, for the designated object, the movement-related parameter such that the designated object returns to the target position and orientation that has been set; and
- ending the return movement of the designated object based on completion of the return movement for the designated object or to an instruction to cancel the return movement by operation input.

23. The game processing method according to claim 22, wherein the movement-related parameter includes at least one of: 1) a velocity and angular velocity; and 2) an acceleration and angular acceleration.

24. The game processing method according to claim 16, wherein the operations further comprise:
- switching, based on received input, from a normal mode in which selection of the designated object is disabled to a selection mode in which selection of the designated object is enabled; and
- in the selection mode, rendering an object selectable as the designated object, in a display form that is different than what is rendered in the normal mode for the designated object.

25. The game processing method according to claim 16, wherein the operations further comprise:
- changing, during the return movement processing of the designated object, a state of the designated object to be a new state, wherein the new state was not used for the designated object during the first time period.

26. The game processing method according to claim 25, wherein the new state includes a disappearance state of the designated object, wherein the operations further comprising:
- based on changing the state of the designated object to the disappearance state, ending the return movement processing for the designated object.

27. The game processing method according to claim 16, wherein instances of position and orientation data are only recorded for future return movement processing in connection with those virtual objects that are moving within the virtual space.

28. The game processing method according to claim 16, wherein the recording of the instances of position and orientation data for each of the plurality of virtual objects during the first time period is further based on each corresponding one of the plurality of virtual objects moving within the virtual space.

29. The game processing method according to claim 28, wherein position and orientation data for those virtual objects within the virtual space that are stationary is not recorded for return movement processing.

30. The game processing method according to claim 16, during the second time period and while the return movement processing for the designated object is being performed, movement and/or processing for other ones of the plurality virtual objects does not use corresponding instances of position and orientation data in processing for those ones of the plurality of virtual objects.

31. A computing system comprising:
- a display;

at least one hardware processor coupled to the display, the at least one hardware processor configured to perform operations comprising:
- controlling a player character in a virtual space based on operation input;
- recording, during a first time period, instances of position and orientation data for each of a plurality of virtual objects that are moving within the virtual space, wherein the instances of position and orientation data for each one of the plurality of virtual objects are stored in a chronological order;
- based on a triggering instruction, setting, for a designated object of the plurality of virtual objects, movement-related parameters used in execution of a virtual physical calculation that includes return movement processing for the designated object by using, over a second time period that is subsequent the first time period, the instances of position and orientation data that have been recorded for the designated object in a reverse chronological order to control, at least in part, how the designated object is to be located and how the designated object is to be oriented within the virtual space during the second time period; and
- repeatedly, over the second time period, displaying, on the display, an updated state of the virtual space that includes the player character, the designated object, and/or other ones of the plurality of virtual objects based on the execution of the virtual physical calculation and the set movement-related parameters.

32. A game apparatus comprising:
a processing system comprising instructions that, when executed by at least one hardware processor included in the processing system, cause the at least one hardware processor to perform operations comprising:
- controlling a player character in a virtual space based on operation input;
- recording, during a first time period, instances of position and orientation data for each of a plurality of virtual objects that are moving within the virtual space, wherein the instances of position and orientation data for each one of the plurality of virtual objects are stored in a chronological order;
- based on a triggering instruction, setting, for a designated object of the plurality of virtual objects, movement-related parameters used in execution of a virtual physical calculation that includes return movement processing for the designated object by using, over a second time period that is subsequent the first time period, the instances of position and orientation data that have been recorded for the designated object in a reverse chronological order to control, at least in part, how the designated object is to be located and how the designated object is to be oriented within the virtual space during the second time period; and
- repeatedly, over the second time period, displaying an updated state of the virtual space that includes the player character, the designated object, and/or other ones of the plurality of virtual objects based on the execution of the virtual physical calculation and the set movement-related parameters.

33. A non-transitory computer-readable storage medium having stored therein a game program executable by a computing device that includes at least one hardware processor, wherein the game program is configured to cause the hardware processor to perform operations comprising:
- controlling a player character in a virtual space based on operation input;
- recording, during a first time period, instances of position and orientation data for each of a plurality of virtual objects that are moving within the virtual space, wherein the instances of position and orientation data for each one of the plurality of virtual objects are stored in a chronological order;
- executing, for a second time period that is subsequent the first time period, reverse movement processing for a designated object by using the instances of position and orientation data that have been recorded for the designated object in a reverse chronological order to control, at least in part, how the designated object is to be located and how the designated object is to be oriented within the virtual space during the second time period;
- executing physics processing for objects within the virtual space during the second time period, wherein the physics processing includes setting movement-related parameters for the designated object from the reverse movement processing; and
- repeatedly, over the second time period, displaying an updated state of the virtual space that includes the player character, the designated object, and/or other ones of the plurality of virtual objects based on the execution of the physics processing and/or the set movement-related parameters.

34. The non-transitory computer-readable storage medium according to claim 33, wherein the operations further comprise:
- at each current point during the reverse movement processing: 1) setting a target position and orientation based on at least one previously recorded instance of position and orientation data, and 2) changing, for the designated object, a velocity and angular velocity, or an acceleration and angular acceleration such that the designated object returns to the set target position and orientation.

35. The non-transitory computer-readable storage medium according to claim 33, wherein each instance of the position and orientation data for each of the plurality of virtual objects corresponds to a frame of execution and each instance is stored on a frame-by-frame basis.

36. The non-transitory computer-readable storage medium according to claim 33, wherein the operations further comprise:
- displaying a movement path, based on recorded instances of position and orientation data for the designated object, on which the designated object is indicated to perform for the reverse movement processing.

37. The non-transitory computer-readable storage medium according to claim 33, each instance of the position and orientation data for the designated object corresponds to a different frame of execution and each instance is stored on a frame-by-frame basis,
the operations further comprising:
- based on selection of the designated object, displaying a movement path for the designated object based on the stored positions and orientations for the designated object;
- at each frame during the reverse movement processing: 1) setting a target position and orientation based on at least one previously recorded instance of position and orientation data, and 2) changing, for the designated object, the movement-related parameter such that the designated object returns to the target position and orientation that has been set; and ending the reverse movement processing of the designated object based on completion of reverse movement for the designated object or to an instruction to cancel the reverse movement processing by operation input.

38. The non-transitory computer-readable storage medium according to claim 33, wherein the operations further comprise:
switching, based on received input, from a normal mode in which selection of the designated object is disabled to a selection mode in which selection of the designated object is enabled; and
in the selection mode, rendering an object selectable as the designated object, in a display form that is different than what is rendered in the normal mode for the designated object.

39. The non-transitory computer-readable storage medium according to claim 33, wherein the operations further comprise:
changing, during the reverse movement processing for the designated object, a state of the designated object to be a new state, wherein the new state was not used for the designated object during the first time period.

40. The non-transitory computer-readable storage medium according to claim 39, wherein the new state includes removing the designated object from being displayed, wherein the operations further comprising:
based on changing the state of the designated object to the new state, ending reverse movement processing for the designated object.

41. The non-transitory computer-readable storage medium according to claim 33, wherein the recording of the instances of position and orientation data for each of the plurality of virtual objects during the first time period is further based on each corresponding one of the plurality of virtual objects moving within the virtual space.

42. The non-transitory computer-readable storage medium according to claim 41, wherein position and orientation data for those virtual objects within the virtual space that are stationary is not recorded for return movement processing.

43. The non-transitory computer-readable storage medium according to claim 33, during the second time period and while the reverse movement processing for the designated object is being performed, movement and/or processing for other ones of the plurality virtual objects does not use corresponding instances of position and orientation data in processing for those ones of the plurality of virtual objects.

44. A method that is performed on a computing device that includes at least one hardware processor, the method comprising:
controlling a player character in a virtual space based on operation input;
recording, during a first time period, instances of position and orientation data for each of a plurality of virtual objects that are moving within the virtual space, wherein the instances of position and orientation data for each one of the plurality of virtual objects are stored in a chronological order;
executing, for a second time period that is subsequent the first time period, reverse movement processing for a designated object by using the instances of position and orientation data that have been recorded for the designated object in a reverse chronological order to control, at least in part, how the designated object is to be located and how the designated object is to be oriented within the virtual space during the second time period;
executing physics processing for objects within the virtual space during the second time period, wherein the physics processing includes setting movement-related parameters for the designated object from the reverse movement processing; and
repeatedly, over the second time period, displaying an updated state of the virtual space that includes the player character, the designated object, and/or other ones of the plurality of virtual objects based on the execution of the physics processing and/or the set movement-related parameters.

45. The method according to claim 44, wherein the operations further comprise:
at each current point during the reverse movement processing: 1) setting a target position and orientation based on at least one previously recorded instance of position and orientation data, and 2) changing, for the designated object, a velocity and angular velocity, or an acceleration and angular acceleration such that the designated object returns to the set target position and orientation.

46. The method according to claim 44, wherein each instance of the position and orientation data for each of the plurality of virtual objects corresponds to a frame of execution and each instance is stored on a frame-by-frame basis.

47. The method according to claim 44, wherein the operations further comprise:
displaying a movement path, based on recorded instances of position and orientation data for the designated object, on which the designated object is indicated to move within the virtual space.

48. The method according to claim 44, each instance of the position and orientation data for the designated object corresponds to a different frame of execution and each instance is stored on a frame-by-frame basis,
the operations further comprising:
based on selection of the designated object, displaying a movement path for the designated object based on the stored positions and orientations for the designated object;
at each frame during the reverse movement processing: 1) setting a target position and orientation based on at least one previously recorded instance of position and orientation data, and 2) changing, for the designated object, the movement-related parameter such that the designated object returns to the target position and orientation that has been set; and
ending the reverse movement processing of the designated object based on completion of return movement for the designated object or to an instruction to cancel the return movement by operation input.

49. The method according to claim 44, wherein the operations further comprise:
switching, based on received input, from a normal mode in which selection of the designated object is disabled to a selection mode in which selection of the designated object is enabled; and
in the selection mode, rendering an object selectable as the designated object, in a display form that is different than what is rendered in the normal mode for the designated object.

50. The method according to claim 44, wherein the operations further comprise:
changing, during the reverse movement processing of the designated object, a state of the designated object to be a new state, wherein the new state was not used for the designated object during the first time period.

51. The method according to claim 50, wherein the new state includes removing the designated object from being displayed, wherein the operations further comprising:
based on changing the state of the designated object to the new state, ending the reverse movement processing for the designated object.

52. The method according to claim 44, wherein the recording of the instances of position and orientation data for each of the plurality of virtual objects during the first time period is further based on each corresponding one of the plurality of virtual objects moving within the virtual space.

53. The method according to claim 52, wherein position and orientation data for those virtual objects within the virtual space that are stationary is not recorded for return movement processing.

54. The method according to claim 44, during the second time period and while reverse movement processing for the designated object is being performed, movement and/or processing for other ones of the plurality virtual objects does not use corresponding instances of position and orientation data in processing for those ones of the plurality of virtual objects.

55. A game apparatus comprising:
a processing system comprising instructions that, when executed by at least one hardware processor included in the processing system, cause the at least one hardware processor to perform operations comprising:
controlling a player character in a virtual space based on operation input;
recording, during a first time period, instances of position and orientation data for each of a plurality of virtual objects that are moving within the virtual space, wherein the instances of position and orientation data for each one of the plurality of virtual objects are stored in a chronological order;
executing, for a second time period that is subsequent the first time period, reverse movement processing for a designated object by using the instances of position and orientation data that have been recorded for the designated object in a reverse chronological order to control, at least in part, how the designated object is to be located and how the designated object is to be oriented within the virtual space during the second time period;
executing physics processing for objects within the virtual space during the second time period, wherein the physics processing includes setting movement-related parameters for the designated object from the reverse movement processing; and
repeatedly, over the second time period, displaying an updated state of the virtual space that includes the player character, the designated object, and/or other ones of the plurality of virtual objects based on the execution of the physics processing and/or the set movement-related parameters.

56. A computing system comprising:
a display; and
at least one hardware processor coupled to the display, the at least one hardware processor configured to perform operations comprising:
controlling a player character in a virtual space based on operation input;
recording, during a first time period, instances of position and orientation data for each of a plurality of virtual objects that are moving within the virtual space, wherein the instances of position and orientation data for each one of the plurality of virtual objects are stored in a chronological order,
executing, for a second time period that is subsequent the first time period, reverse movement processing for a designated object by using the instances of position and orientation data that have been recorded for the designated object in a reverse chronological order to control, at least in part, how the designated object is to be located and how the designated object is to be oriented within the virtual space during the second time period,
executing physics processing for objects within the virtual space during the second time period, wherein the physics processing includes setting movement-related parameters for the designated object from the reverse movement processing, and
repeatedly, over the second time period, displaying an updated state of the virtual space that includes the player character, the designated object, and/or other ones of the plurality of virtual objects based on the execution of the physics processing and/or the set movement-related parameters.

* * * * *